US012770855B2

(12) United States Patent
Silveira et al.

(10) Patent No.: US 12,770,855 B2
(45) Date of Patent: Oct. 20, 2026

(54) AUTOMATIC POSITIONING OF AN ELECTROSPRAY IONIZATION EMITTER

(71) Applicant: Thermo Finnigan LLC, San Jose, CA (US)

(72) Inventors: Joshua A. Silveira, Gilroy, CA (US); Eloy R. Wouters, San Jose, CA (US); Gary A. Schultz, Ithaca, NY (US)

(73) Assignee: Thermo Finnigan LLC, San Jose, CA (US)

(*) Notice: Subject to any disclaimer, the term of this patent is extended or adjusted under 35 U.S.C. 154(b) by 421 days.

(21) Appl. No.: 18/530,851

(22) Filed: Dec. 6, 2023

(65) Prior Publication Data

US 2024/0404815 A1 Dec. 5, 2024

Related U.S. Application Data

(60) Provisional application No. 63/470,649, filed on Jun. 2, 2023.

(51) Int. Cl.

| | |
|---|---|
| ***H01J 49/16*** | (2006.01) |
| ***G06T 7/73*** | (2017.01) |
| ***G06V 10/12*** | (2022.01) |
| ***G06V 20/52*** | (2022.01) |
| ***H01J 49/02*** | (2006.01) |
| ***H01J 49/04*** | (2006.01) |

(52) U.S. Cl.

CPC .............. *H01J 49/165* (2013.01); *G06T 7/74* (2017.01); *G06V 10/12* (2022.01); *G06V 20/52* (2022.01); *H01J 49/025* (2013.01); *H01J 49/04* (2013.01); *G06T 2207/30204* (2013.01)

(58) Field of Classification Search

CPC ........ H01J 49/165; H01J 49/025; H01J 49/04; H01J 49/0009; H01J 49/0027

See application file for complete search history.

(56) References Cited

U.S. PATENT DOCUMENTS

| | | | | |
|---|---|---|---|---|
| 9,082,600 | B1 * | 7/2015 | Greving ................ | B01L 3/5088 |
| 11,791,144 | B2 | 10/2023 | Kalafut et al. | |
| 2004/0173743 | A1 * | 9/2004 | Valaskovic ........... | H01J 49/165 250/288 |
| 2005/0072915 | A1 * | 4/2005 | Stults .................. | H01J 49/0018 250/288 |
| 2006/0273808 | A1 * | 12/2006 | Van Berkel ......... | H01J 49/0004 324/754.04 |

(Continued)

FOREIGN PATENT DOCUMENTS

| | | | |
|---|---|---|---|
| CN | 209132210 | U * | 7/2019 |
| EP | 4471826 | A2 | 12/2024 |
| WO | 2023031833 | A1 | 3/2023 |

OTHER PUBLICATIONS

EP24213878.2, Extended European Search Report, May 8, 2025, 7 pages.

(Continued)

*Primary Examiner* — David E Smith

(57) ABSTRACT

A position control system may obtain image data representative of one or more images that depict an inlet of a mass spectrometer and an emitter positioned near the inlet and adjust, based on the image data, a position of the emitter relative to the inlet to an optimum position that is at or near a reference position relative to the inlet.

15 Claims, 20 Drawing Sheets

(56) References Cited

U.S. PATENT DOCUMENTS

| | | | | |
|---|---|---|---|---|
| 2014/0319042 | A1* | 10/2014 | Prentice ................. | B01D 15/10 239/589 |
| 2019/0108991 | A1* | 4/2019 | Ueda ..................... | H01J 49/167 |
| 2022/0293405 | A1 | 9/2022 | Kalafut et al. | |

OTHER PUBLICATIONS

European Search Report received in EP Application No. 24179627 on Oct. 31, 2024.

* cited by examiner

AUTOMATIC POSITIONING OF AN ELECTROSPRAY IONIZATION EMITTER

RELATED APPLICATIONS

The present application claims priority to U.S. Provisional Patent Application No. 63/470,649, filed on Jun. 2, 2023, the contents of which are hereby incorporated by reference in their entirety.

BACKGROUND INFORMATION

A mass spectrometer is a sensitive instrument that may be used to detect, identify, and/or quantify molecules based on their mass-to-charge ratio (m/z). A mass spectrometer generally includes an ion source for generating ions from components included in the sample, a mass analyzer for separating the ions based on their m/z, and an ion detector for detecting the separated ions. The mass spectrometer may be connected to a computer-based software platform that uses data from the ion detector to construct a mass spectrum that shows a relative abundance of each of the detected ions as a function of m/z. The m/z of ions may be used to detect and quantify molecules in simple and complex mixtures.

An ion source may generate ions from an analyte in many different ways. In conventional electrospray ionization (ESI), a liquid sample flows through a small-diameter capillary emitter positioned in front of a mass analyzer inlet. A high voltage is applied to the liquid sample in the emitter to generate an electrospray that results in the formation of analyte ions. Analyte ions that enter the mass analyzer inlet are then analyzed by mass spectrometry to generate mass spectra of the analyte ions. In conventional ESI, the liquid sample has a flow rate ranging from about 1 microliter (μL) per minute (1 μL/min) to about 1 milliliter (mL) per minute (1 mL/min). In nanospray ionization (NSI), the liquid sample flows through the emitter under nanoscale flow rates ranging from about 10-50 nanoliters (nL) per minute (10-50 nL/min) to about 1000-1500 nL/min. The lower flow rates of NSI produce smaller aerosol droplets, which makes NSI more efficient than conventional ESI at ionizing the analytes. As a result, NSI produces significant increases in sensitivity, as demonstrated by the signal response of the mass spectrometer.

However, the sensitivity, efficiency, stability, and reproducibility of ESI methods varies with the position of the emitter relative to the mass analyzer inlet among other factors, such as solvent conditions, mobile phase composition, flow rate, analyte chemistry, electrospray voltage and current, sheath (or nebulization) gas flow rate, ambient pressure, temperature, and inlet geometry. This is particularly true for NSI, in which the spatial optimum position of the emitter depends on spray mode and is a fraction of a millimeter wide in all directions. For example, deviations of the emitter position from an optimal position by only 100 microns (μm) may result in a 20% decrease in signal intensity and decreased signal stability. Furthermore, inconsistent emitter positioning across different instrument configurations may make experiments difficult to reproduce accurately.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a system comprises: one or more processors; and memory storing executable instructions that, when executed by the one or more processors, cause a computing device to perform a process comprising: obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet.

In some illustrative examples, a non-transitory computer-readable medium stores instructions that, when executed, direct at least one processor of a computing device for mass spectrometry to perform a process comprising: obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet.

In some illustrative examples, a system comprises an automated positioning system configured to hold an ionization emitter near an inlet of a mass spectrometer and adjust a position of the ionization emitter relative to the inlet of the mass spectrometer; an imaging system configured to capture images of the ionization emitter and the inlet of the mass spectrometer; and a position control system configured to perform a process comprising: obtaining, from the imaging system, image data representative of one or more images that depict the inlet of the mass spectrometer and the ionization emitter positioned near the inlet; and directing, based on the image data, the automated positioning system to adjust the position of the ionization emitter relative to the inlet of the mass spectrometer to an optimum position that is at or near a reference position relative to the inlet.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
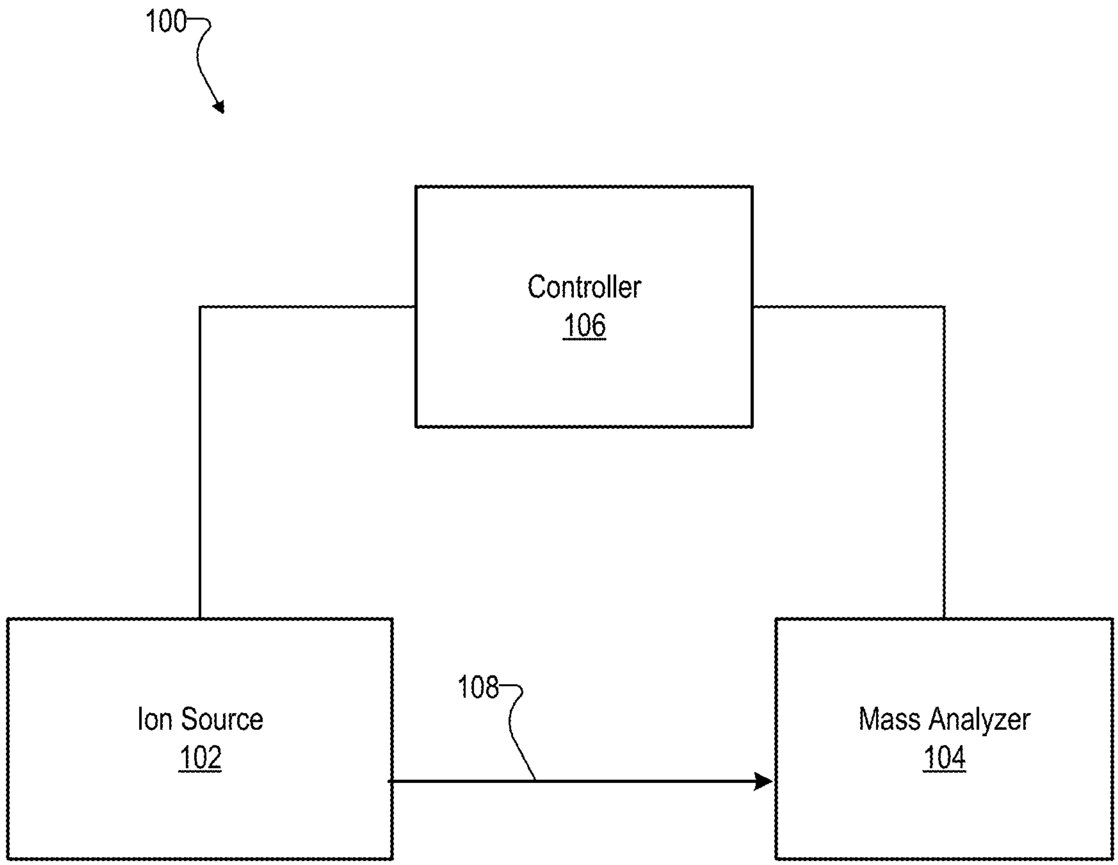
FIG. 1 shows functional components of an illustrative mass spectrometer.

As described herein, a position control system may automatically identify an optimum position for an ionization emitter. In some illustrative examples, the position control system may acquire a set of mass spectra by directing an automated positioning system to sequentially position an ionization emitter at a plurality of positions relative to an inlet of a mass spectrometer (e.g., an inlet of a mass analyzer). The position control system may direct the mass spectrometer to acquire, while the ionization emitter is positioned at each position of the plurality of positions, a mass spectrum of ions introduced into the inlet. The ions introduced into the inlet include ions emitted from the ionization emitter. The position control system may generate, based on the set of mass spectra, an ion intensity map representing detected intensity of ions introduced into the inlet of the mass spectrometer as a function of position of the ionization emitter. Based on the ion intensity map, the position control system may identify an optimum position for the ionization emitter. The position control system may also position the ionization emitter at the optimum position. An experimental analysis may then be performed with the ionization emitter at the optimum position.

In other illustrative examples, a position control system may obtain image data representative of one or more images that depict an inlet of a mass spectrometer and an ionization emitter positioned near the inlet. Based on the image data, the position control system may adjust a position of the ionization emitter relative to the inlet. In this way, the position control system may position the ionization emitter at or near a reference position relative to the inlet. An experimental analysis may then be performed with the ionization emitter at the reference position.

The systems and methods described herein provide various benefits, which may include one or more advantages over conventional systems and ion sources. For example, in some conventional systems the position of the emitter is fixed at a single position and cannot be adjusted, while other conventional systems require manual emitter adjustments, such as with a micrometer. As a result, the conventional systems have suboptimal sensitivity and poor reproducibility of method performance from emitter to emitter, installation to installation, and user to user. In contrast, the systems and methods described herein fully automate the emitter positioning process. Additionally, the systems and methods described herein may be configured to adjust the position of the emitter to optimize one or more characteristics of the detected signal, such as signal intensity, signal-to-noise ratio, and signal stability. In other examples, the systems and methods described herein may be configured to adjust the position of the emitter to or near a reference position. As a result, the systems and methods described herein improve sensitivity and/or reproducibility, even across different emitters, installations, and users. Moreover, the systems and methods described herein can be performed faster as compared with manual adjustments of the conventional systems. Additionally, in some examples the systems and methods described herein may be performed using only the solvent system and flow conditions commonly used during column equilibration and/or column washing without injecting analytes into the mobile phase. Moreover, the systems and methods described herein can be used on many different solvent systems with various mobile phase compositions, and do not require knowledge about the particular solvent system used during an experiment. In some examples, the emitter can be automatically positioned without acquiring any mass spectra and without the need for any ions or solvent.

Various embodiments will now be described in more detail with reference to the figures. The systems and methods described herein may provide one or more of the benefits mentioned above and/or various additional and/or alternative benefits that will be made apparent herein.

The systems and methods described herein may be implemented in conjunction with a mass spectrometer. FIG. 1 shows functional components of an illustrative mass spectrometer 100. As shown, mass spectrometer 100 includes an ion source 102, a mass analyzer 104, and a controller 106. Mass spectrometer 100 may further include any additional or alternative components (not shown) as may suit a particular implementation (e.g., ion optics, filters, an autosampler, etc.).

Ion source 102 is configured to produce a stream 108 of ions from a sample by electrospray ionization (ESI) and deliver the ions to mass analyzer 104. An illustrative ion source is described below in more detail with reference to FIG. 2.

Mass analyzer 104 is configured to receive ion stream 108 and separate the ions according to m/z of each of the ions. Mass analyzer 104 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, a sector mass analyzer, and the like.

An ion detector (not shown) is configured to detect ions at each of a variety of different m/z and responsively generate an electrical signal representative of ion intensity. The electrical signal is transmitted to controller 106 for processing, such as to construct a mass spectrum of the sample. For example, mass analyzer 104 may emit an emission beam of separated ions to the ion detector, which is configured to detect the ions in the emission beam and generate or provide data that can be used by controller 106 to construct a mass spectrum of the sample. The ion detector may be implemented by any suitable detection device, including without limitation an electron multiplier, a Faraday cup, and the like.

Controller 106 may be communicatively coupled with, and configured to control operations of, mass spectrometer 100. For example, controller 106 may be configured to control operation of various hardware components included in ion source 102 and/or mass analyzer 104. To illustrate, controller 106 may be configured to control a high voltage applied to an emitter in ion source 102, control an accumulation time of mass analyzer 104, control an oscillatory voltage power supply and/or a DC power supply to supply an RF voltage and/or a DC voltage to mass analyzer 104, adjust values of the RF voltage and DC voltage to select an effective m/z (including a mass tolerance window) for analysis, and adjust the sensitivity of the ion detector (e.g., by adjusting the detector gain).

Controller 106 may also include and/or provide a user interface configured to enable interaction between a user of mass spectrometer 100 and controller 106. The user may interact with controller 106 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 106. In other examples the display device and/or input device may be separate from, but communicatively coupled to, controller 106. For instance, the display device and the input device may be included in a computer (e.g., a desktop computer, a laptop computer, etc.) communicatively connected to controller 106 by way of a wired connection (e.g., by one or more cables) and/or a wireless connection.

Controller 106 may include any suitable hardware (e.g., a processor, circuitry, etc.) and/or software as may serve a particular implementation. While FIG. 1 shows that controller 106 is included in mass spectrometer 100, controller 106 may alternatively be implemented in whole or in part separately from mass spectrometer 100, such as by a computing device communicatively coupled to mass spectrometer 100 by way of a wired connection (e.g., a cable) and/or a network (e.g., a local area network, a wireless network (e.g., Wi-Fi), a wide area network, the Internet, a cellular data network, etc.).

In some embodiments, mass spectrometer 100 may be implemented by a tandem mass spectrometer, which may be tandem-in-time or tandem-in-space. For example, a tandem-in-space mass spectrometer may include, in addition to mass analyzer 104, one or more collision cells and one or more additional mass analyzers (not shown in FIG. 1). The term "collision cell," as used herein, is intended to encompass any structure arranged to produce product ions via controlled dissociation processes and is not limited to devices employed for collisionally-activated dissociation. For example, a collision cell may be configured to fragment the ions using collision induced dissociation (CID), electron transfer dissociation (ETD), electron capture dissociation (ECD), photo induced dissociation (PID), surface induced dissociation (SID), and the like. A collision cell may be positioned upstream from a mass filter, which separates the fragmented ions based on the ratio of mass to charge of the ions. In some embodiments, mass analyzer 104 may include a combination of multiple mass filters and/or collision cells, such as a triple quadrupole mass analyzer, where a collision cell is interposed in the ion path between independently operable mass filters.

In some embodiments, mass spectrometer 100 may be coupled with a separation system in a combined system configured to separate components of a sample to be analyzed by mass spectrometer 100. In an analytical run performed by a combined system, the separation system is configured to receive a sample to be analyzed and separate certain components within the sample. In some examples, the separation system may also detect a relative abundance of the separated components, such as by generating a chromatogram representative of the components within the sample. The separation system may be implemented by any device configured to separate components included in the sample, such as a liquid chromatograph (LC) (e.g., a high-performance liquid chromatograph (HPLC)), a gas chromatograph (GC), an ion chromatograph, a capillary electrophoresis system, and the like. Components separated by the separation system are delivered to mass spectrometer 100 for mass analysis by mass spectrometer 100.

Figure 2:
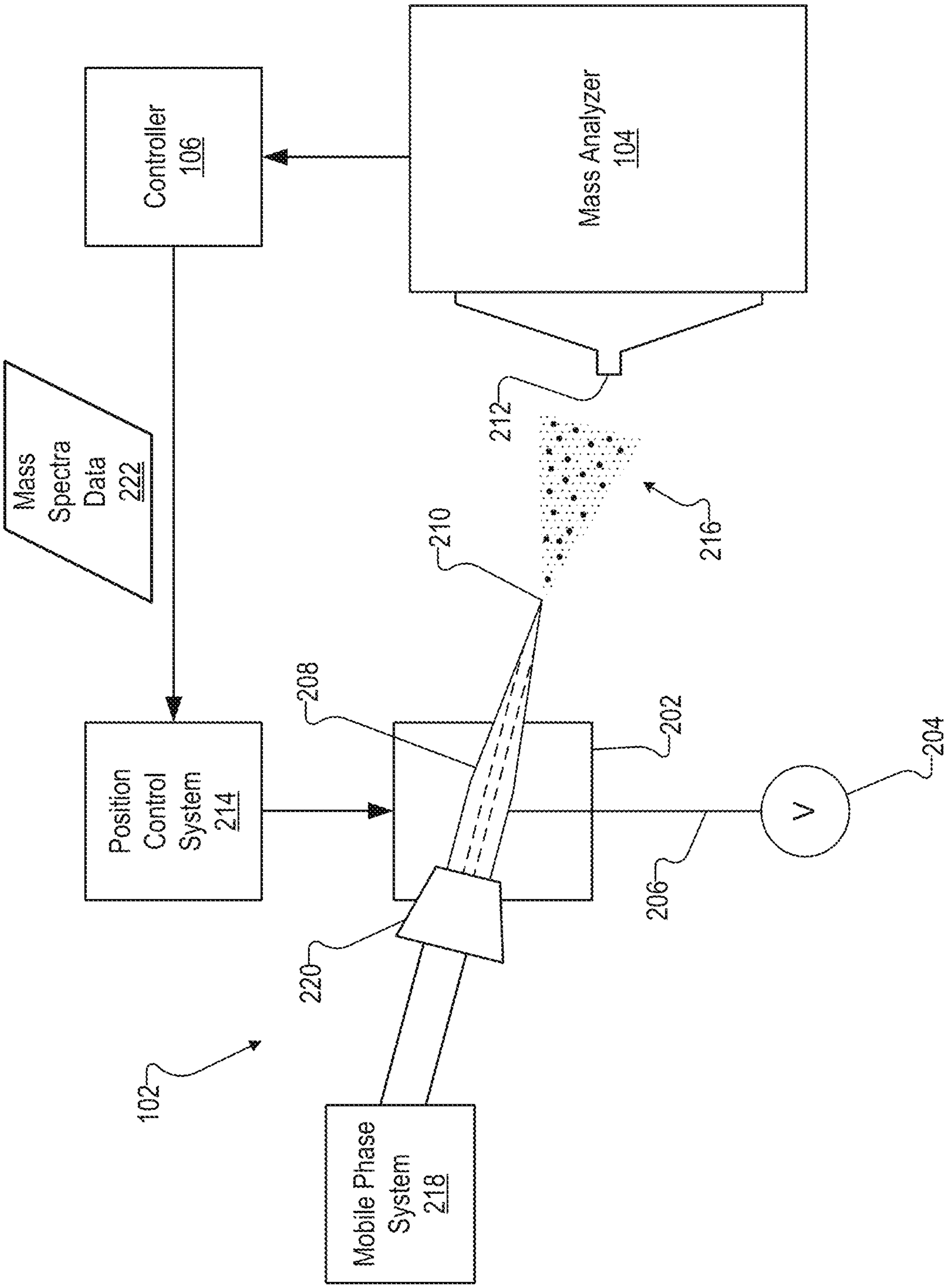
FIG. 2 shows a functional diagram of an illustrative implementation of an ion source included in the mass spectrometer of FIG. 1.

FIG. 2 shows a functional diagram of an illustrative implementation of an interface between ion source 102 and mass analyzer 104. FIG. 2 is merely illustrative, as ion source 102 and mass analyzer 104 may have other suitable configurations. As shown, ion source 102 includes an automated positioning system 202, a high voltage source 204, and a high voltage line 206. Ion source 102 may also include additional or alternative components not shown in FIG. 2 as may serve a particular implementation, such as a source housing (e.g., that houses components of ion source 102 and/or attaches to mass analyzer 104), cameras, adapters, locks, mounting components, gas supply lines, and the like.

Automated positioning system 202 is configured to hold an emitter 208 having a tip 210 at a controlled distance (e.g., about 0.1-3 cm) from an inlet 212 to mass analyzer 104. Inlet 212 is shown adjacent to mass analyzer 104 for illustrative purposes only. It will be recognized that various other components may be positioned between inlet 212 and mass analyzer 104, such as but not limited to ion optics, ion guides, ion traps, ion mobility separators, filters, and/or collision cells. Inlet 212 may have any suitable configuration, such as an orifice or a capillary (e.g., an ion transfer tube (ITT), such as a round bore ITT, or a high capacity transfer tube (HCTT), such as a letterbox inlet). In alternative examples, inlet 212 is a field asymmetric ion mobility spectrometry (FAIMS) entrance orifice, with the FAIMS electrodes positioned directly in front of the inlet to the mass analyzer. When emitter 208 is mounted on automated positioning system 202, automated positioning system 202 may automatically adjust the position of emitter 208 (e.g., the position of tip 210) relative to inlet 212 in response to control signals received from a position control system 214.

Operations of position control system 214 and feedback control of automated positioning system 202 will be described below in more detail. Automated positioning system 202 may include any suitable mechanical and/or electrical components (e.g., actuators, gears, motors, shafts, cranks, slides, stages, etc.) configured to translationally and/or rotationally adjust a position of emitter 208 with anywhere from one to six degrees of freedom. In some examples, emitter 208 is mounted to a movable carriage of automated positioning system 202, and the movable carriage may be moved by a precision motion system, an XYZ robot, an XYZ manipulator, one or more linear translation stages, one or more rotational stages, one or more piezoelectric actuators, and/or any combination of the foregoing.

Emitter 208 may be a needle or a capillary tube configured for electrospray ionization. Emitter 208 may be formed, for example, of glass, stainless steel, borosilicate, or any other suitable material, and may be coated with an outer coating, such as a polyimide or other polymer coating. In some examples, emitter 208 is configured for the low flow rates of NSI (e.g., from about 10-50 nL/min up to about 1000-1500 nL/min). In other examples, emitter 208 is configured for capillary flow rates (e.g., from about 1 μL/min up to about 10-20 μL/min), microflow rates (e.g., from about 10 μL/min up to about 100 μL/min), or conventional ESI analytical flow rates (e.g., greater than about 50 μL/min). Emitter 208 may be included in an emitter cartridge that may include, without limitation, a mounting unit for holding emitter 208 and mounting to automated positioning system 202 (e.g., a mounting arm that may couple to a movable carriage of automated positioning system 202), adapters for connecting or integrating emitter 208 with a separation system (e.g., an LC or GC analytical column), onboard nonvolatile memory (which may store position data and/or other data that may be used for positioning of emitter 208), and/or any other suitable components. In some examples in which the emitter cartridge includes onboard memory, emitter cartridge may be communicatively coupled with controller 106 and/or position control system 214, such as by way of a wired or wireless connection.

A mobile phase system 218 provides a liquid solution that flows through emitter 208. The liquid solution may include a solvent and, when a sample has been injected in the liquid solution, the sample. Mobile phase system 218 may include, for example, a mobile phase pump, a syringe pump, a separation system (e.g., an LC or GC system), a container, or any other suitable source or combination of sources of a mobile phase. When ion source 102 is used for NSI, the mobile phase flows through emitter 208 under nanoscale flow rates ranging from about 10 nL/min up to about 1000 or 1500 nL/min.

Voltage source 204 is configured to apply a direct current spray voltage (e.g., about 2-6 kilovolts (kV) for ESI or about 0.7-3.5 kV for NSI) to emitter 208 or the mobile phase by way of high voltage line 206 (e.g., an electrical cable or other wiring or electrical connection). The spray voltage produces a strong electric field at tip 210 of emitter 208. Alternatively, the electric field may be generated by applying the high voltage to mass analyzer inlet 212 with emitter 208 at ground. The electric field induces ion migration in the mobile phase as the ions are emitted from tip 210, resulting in electrohydrodynamic disintegration of the mobile phase, generation of charged droplets, and formation of a spray plume 216 that travels toward inlet 212 of mass analyzer 104. As spray plume 216 travels toward inlet 212, the solvent evaporates from the charged droplets, causing the charge intensity on the surface of the droplets to gradually increase until the droplets split into one or more charged gas phase ions. The charged gas phase ions are then introduced into inlet 212 of mass analyzer 104 by application of the electric field, vacuum at the inlet, and if present, sheath gas at the emitter.

In some examples, emitter 208 is inserted in a nozzle 220 and a sheath gas, such as nitrogen gas ($N_2$), flows coaxially around emitter 208 within nozzle 220. As the mobile phase exits tip 210, the sheath gas exits a distal end of nozzle 220 and flows around spray plume 216, thereby controlling the position, shape, and direction of spray plume 216 and reducing the stratification of mass. The sheath gas flow rate may be adjusted to achieve a desired position and shape of spray plume 216. The sheath gas may also reduce the surface tension barrier to initiate spray plume 216 formation. In further examples, a heated auxiliary gas may be used to aid in desolvation of the charged droplets in spray plume 216. However, at low flow rates (e.g., nanoflow) good sensitivity may be obtained without a sheath gas and/or auxiliary gas.

In some examples, as shown in FIG. 2, emitter 208 is angled relative to a longitudinal axis of inlet 212. Any suitable angle may be used (e.g., 45°, 30°, 22.5°, 15°, etc.). In other examples, emitter 208 is not angled relative to the longitudinal axis of inlet 212 but is positioned so that a longitudinal axis of emitter 208 and the longitudinal axis of inlet 212 are substantially parallel.

If a sample has been injected into the mobile phase, the electrospray ionization process produces gas phase analyte ions from analyte molecules included in the sample and introduces the analyte ions into mass analyzer 104. The electrospray ionization process also produces some solvent ions and introduces the solvent ions into inlet 212 of mass analyzer 104, together with analyte ions if a sample has been injected into the mobile phase. Solvent ions include ion species that are derived from non-analyte solvent molecules (e.g., molecules present in the mobile phase such as, but not limited to, solvent molecules, mobile phase additive or modifier molecules, and mobile phase contaminant or impurity molecules), ion species that are adducted with non-analyte solvent molecules, and/or ion species that are derived from solvent clusters (e.g., clusters of more than one non-analyte solvent molecule). The electrospray ionization process also produces ambient ions, incorporates the ambient ions into the charged droplets, and introduces the ambient ions into inlet 212 of mass analyzer 104, together with the solvent ions and, if a sample has been injected into the mobile phase, with the analyte ions. Ambient ions are derived from ambient molecules. Ambient molecules are not present in the mobile phase but are vapor species present in the environment around tip 210 of emitter 208. Ambient molecules may be ionized through charge transfer reactions with spray plume 216. One common group of ambient molecules are polysiloxanes, which may originate from sources such as deodorants, perfumes, floor wax, and/or room sprays.

Mass analyzer 104 receives the ions in spray plume 216 that enter inlet 212 and performs a mass analysis of the analyte ions. As explained above, controller 106 may process the received signals and construct mass spectra of the ions introduced into inlet 212 based on the signals detected by the ion detector in mass analyzer 104. Position control system 214 may receive data representative of the mass spectra ("mass spectra data 222") generated by controller 106 and use mass spectra data 222 to determine an optimal position of emitter 208 relative to inlet 212 and to control automated positioning system 202 to adjust a position of emitter 208 relative to inlet 212. While FIG. 2 shows that position control system 214 is separate from controller 106, in some examples position control system 214 is implemented, in whole or in part, by controller 106 and/or automated positioning system 202.

When the quality of the detected signal is the priority to the user, such as signal intensity, signal-to-noise ratio, and signal stability, emitter 208 should be positioned relative to inlet 212 so that the detected signal from analyte ions is optimized. However, analyte ions are not easily used for optimization of the position of emitter 208 when a chromatographic column is coupled with emitter 208. Analyte molecules cannot easily be injected into the mobile phase due to analyte molecule interactions with the stationary phase in the column, which interactions make it difficult to obtain a steady-state response for position optimization. An injection port for injection of analyte molecules may be added downstream of the column but upstream of the emitter. However, an injection port would require modifying existing systems with new hardware. In view of these issues associated with analyte ions, position control system 214 optimizes the emitter position based on proxy ions.

Proxy ions are non-analyte ions that are expected or assumed to behave in space similarly to how analyte ions would behave in the same space under the same conditions. Since analyte ions originate at tip 210 of emitter 208 and advance toward inlet 212 in spray plume 216 when a sample is injected into the mobile phase, non-analyte ions that originate at tip 210 and advance toward inlet 212 in spray plume 216 are assumed to behave similarly to analyte ions and are thus referred to herein as proxy ions. Proxy ions generally include solvent ions, which also originate at tip 210, and may also include ambient ions that originate at or near tip 210 and advance toward inlet in spray plume 216. On the other hand, some ambient ions do not originate at or near tip 210 and/or do not travel the same path as proxy ions toward inlet 212. Such ambient ions do not accurately mimic the behavior of analyte ions and thus are referred to herein as contaminant ions. As will be explained below, in some examples position control system 214 assumes that the influence of contaminant ions is minimal and thus treats all ions that are introduced into inlet 212 and mass analyzed, including both solvent ions and contaminant ions, as proxy ions. In other examples, position control system 214 classifies certain detected ions as contaminant ions and excludes the contaminant ions when optimizing the position of emitter 208. In the examples that follow, the position of emitter 208 may be optimized using only the mobile phase without injecting a sample into the mobile phase and without the need for any additional hardware.

When reproducibility of the emitter position across different emitters, instruments, and/or installations is the priority to the user, position control system 214 optimizes the emitter position without the need to generate or analyze any ions. Instead, position control system 214 optimizes the emitter position based on images of the emitter and inlet as captured by one or more cameras included in ion source 102.

Figure 3:
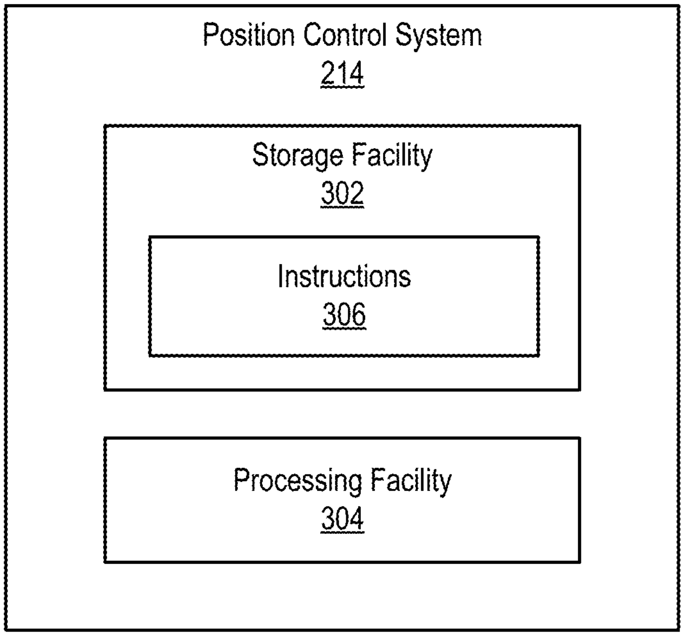
FIG. 3 shows an illustrative functional diagram of a position control system.

FIG. 3 shows an illustrative functional diagram of position control system 214. Position control system 214 may be implemented separately from mass spectrometer 100. In some examples, position control system 214 is implemented entirely or in part by mass spectrometer 100 (e.g., by controller 106, by automated positioning system 202, or any other component of mass spectrometer 100) and/or by an emitter cartridge.

Position control system 214 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform any of the operations described herein. For example, storage facility 302 may store instructions 306 that may be executed by processing facility 304 to perform any of the operations described herein. Instructions 306 may be implemented by any suitable application, software, code, and/or other executable data instance.

Storage facility 302 may also maintain any data acquired, received, generated, managed, used, and/or transmitted by processing facility 304. For example, storage facility 302 may maintain mass spectra data 222 and/or optimization algorithm data. Optimization algorithm data may include data representative of, used by, or associated with one or more optimization algorithms maintained by processing facility 304 for optimizing signals acquired by mass spectrometer 100 and positioning emitter 208 relative to inlet 212. Storage facility 302 may also be coupled in a cartridge assembly unit that contains emitter 208 and, optionally, other elements, such as the chromatographic column.

Processing facility 304 may be configured to perform (e.g., execute instructions 306 stored in storage facility 302 to perform) various processing operations described herein. It will be recognized that the operations and examples described herein are merely illustrative of the many different types of operations that may be performed by processing facility 304. In the description herein, any references to operations performed by position control system 214 may be understood to be performed by processing facility 304 of position control system 214. Furthermore, in the description herein, any operations performed by position control system 214 may be understood to include position control system 214 directing or instructing another system or device to perform the operations.

In some examples, position control system 214 is configured to automatically tune ion source 102 to optimize the quality of the signal detected by mass spectrometer 100 (the "MS signal") for a selected m/z, m/z range, or one or more target analytes. As used herein, a "selected m/z" may be a specific m/z with or without a mass tolerance window (e.g., +/−0.5 m/z) or may be a specific narrow m/z range (e.g., 30-120, or 200-220 m/z). The quality of the MS signal may be indicated by the value of one or more figures of merit of the MS signal, such as intensity, spray current, signal-to-noise ratio ("SNR"), relative standard deviation ("RSD"), system robustness, and/or any other suitable figure of merit representative of a quality of the MS signal. The RSD of the detected signal represents stability of the detected signal (e.g., the amount of variability in MS signals), but signal stability may be represented by other figures of merit.

As explained above, the quality of the MS signal may depend on certain user-configurable parameters, such as the position of emitter tip 210 relative to inlet 212, the spray voltage applied to emitter 208, a sheath gas flow rate (in implementations using a sheath gas), a flow rate of the mobile phase flowing to emitter 208, a composition of a solvent in the mobile phase, and/or an electrospray mode (e.g., spindle, multi-spindle, cone jet, multi-jet, etc.). In an NSI ion source, the optimum position of emitter tip 210 may be a fraction of a millimeter wide on all sides. The quality of the MS signal may also depend on other factors that may not be easily controlled by a user, such as ambient conditions (e.g., temperature, ambient air flow, humidity, pressure, etc.), instrument characteristics (e.g., inlet geometry, etc.), and the like. Accordingly, position control system 214 may perform various operations to automatically tune ion source 102 to improve or optimize a figure of merit (e.g., intensity, SNR, and/or RSD), as will now be described.

As used herein, "optimize" and its variants means to seek a best, desired, or satisfactory solution among a set of possible solutions, although the best solution may not necessarily be obtained, such as when an optimization process is terminated (e.g., based on satisfaction of a stop criterion) prior to finding the best solution, when multiple solutions exist that satisfy predefined criteria, or when a selected optimization technique is unable to converge on the best solution. Similarly, as used herein an "optimum" parameter means the solution obtained as the result of performing an optimization process, and thus may not necessarily be the absolute extreme value of the parameter (e.g., the absolute maximum or minimum), but still adjusts the parameter and results in an improvement and/or satisfies one or more criteria.

In some examples, position control system 214 may tune ion source 102 to optimize a figure of merit of the MS signal by controlling automated positioning system 202 to adjust a position of emitter 208 relative to inlet 212 based on mass spectra data 222 acquired by mass spectrometer 100. The position of emitter 208 refers to the position of tip 210 relative to inlet 212 (e.g., a center point of inlet 212 at the front (emitter-side) of inlet 212). Position control system 214 may determine 3D coordinates (or 2D or 1D coordinates when emitter 208 is adjusted or adjustable along only two axes or one axis, respectively) of an optimum position of emitter 208 relative to inlet 212. An optimum position of emitter 208 refers to the spatial position of emitter 208 relative to inlet 212 at which the figure of merit of the detected MS signal has an optimum value (e.g., a maximum intensity value or a maximum SNR) and/or satisfies one or more criteria (e.g., exceeds a threshold intensity level or threshold SNR). It will be recognized that, in some scenarios, there may be multiple optimum positions for emitter 208, such as when multiple different emitter positions produce MS signals for which the figure of merit satisfies a threshold condition or when different figures of merit have different optimum emitter positions.

The position of emitter 208 may be determined based on emitter 208 (e.g., emitter tip 210 or a marker on emitter 208), the emitter cartridge, or a movable carriage of automated positioning system 202. For example, when emitter 208 is mounted to automated positioning system 202, the exact position of emitter tip 210 relative to inlet 212 may not be known since such position may vary across different users, installations, and emitters. Accordingly, the position of emitter 208 (e.g., the position of emitter tip 210) relative to inlet 212 may be determined based on the position (e.g., 3D coordinates) of the movable carriage of automated positioning system 202 to which emitter 208 is mounted since the position of emitter 208 is fixed relative to the movable carriage.

In some examples, position control system 214 tracks the position of the movable carriage using robotics or kinematics. In alternative examples, the position of emitter 208 is tracked by using a depth sensor (e.g., a time-of-flight sensor, an infrared sensor, etc.), interferometer, or computer vision. For example, ion source 102 may include a camera configured to capture images of emitter 208 and determine, based on the captured images, a position of emitter tip 210. In some examples, emitter 208 (or the emitter cartridge) may include a marker (e.g., a reflective sticker or other fiducial) that may be recognized by image recognition and used to determine the position of emitter 208. When the position of the camera relative to inlet 212 is not fixed or is not known, the position of emitter 208 relative to inlet 212 may be determined based on image recognition of both emitter 208 and inlet 212. In yet further examples, the position of emitter 208 may be determined by means of an optical lever.

In the examples that follow, signal intensity is the figure of merit and position control system 214 determines the optimum position of emitter 208 by generating an ion intensity map and identifying, based on the ion intensity map, an optimum position for emitter 208. The ion intensity map is a set of data that represents detected intensity of one or more (or all) ions introduced into inlet 212 of mass analyzer 104 as a function of the spatial position of emitter 208 relative to inlet 212. Illustrative ion intensity maps and methods of generating ion intensity maps will be described below in more detail. An ion intensity map is a type of ion signal quality map. It will be recognized that the examples below may be modified as appropriate to optimize the emitter position based on a different figure of merit of the detected signals, such as SNR or signal stability (e.g., RSD). In these examples, position control system 214 may generate a different ion signal quality map (e.g., an SNR map or an RSD map, as the case may be), and identify the optimum emitter position based on the ion signal quality map.

Figure 4:
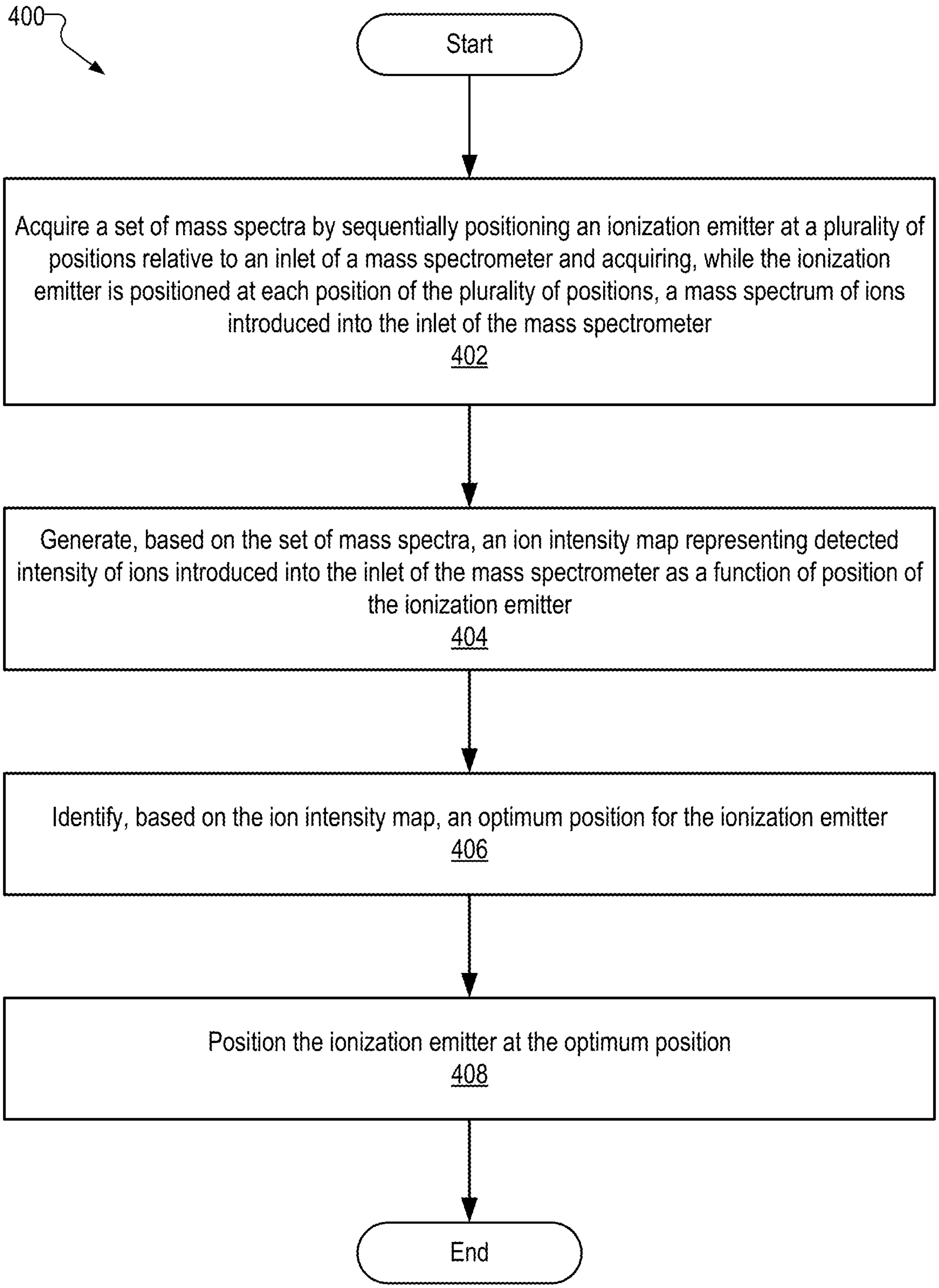
FIG. 4 shows a flowchart of an illustrative method for optimizing the position of an emitter relative to an inlet of a mass spectrometer.

FIG. 4 shows a flowchart of an illustrative method 400 for optimizing a position of emitter 208 relative to inlet 212. While FIG. 4 shows illustrative operations according to one embodiment, other embodiments may omit, add to, reorder, and/or modify any of the operations shown in FIG. 4. Each operation of method 400 may be performed in any suitable way.

At operation 402, position control system 214 acquires a set of mass spectra. The set of mass spectra is a set of mass spectra data that may be used to generate an ion intensity map. Position control system 214 may acquire the set of mass spectra by directing automated positioning system 202 to sequentially position emitter 208 at a plurality of positions within a search area located near inlet 212 and directing mass spectrometer 100 to acquire, while emitter 208 is positioned at each position of the plurality of positions, a mass spectrum of ions introduced into inlet 212 of mass analyzer 104. The set of mass spectra includes the respective mass spectrum acquired at each emitter position. The ions introduced into inlet 212 include ions emitted from emitter 208 (e.g., solvent ions) and, in some cases, ambient ions present in the environment near emitter 208 and/or inlet 212.

The mass spectra may be acquired in any suitable way. In some examples, the mass spectra are acquired by a full MS acquisition (e.g., a wide m/z range MS acquisition, such as 30-1000 m/z, 400-1000 m/z, etc.). MS acquisitions may be acceptable for faster instruments, such as time-of-flight and ion trap (e.g., orbital ion trap) mass analyzers. In other examples, the mass spectra are acquired by an MS/MS acquisition, such as a selected ion monitoring (SIM) acquisition having a wide isolation window. For example, a SIM acquisition may cover a narrower m/z range in which proxy ions are expected and/or in which contaminant ions are not expected, or not expected to be detected with high abundance. SIM acquisitions may be acceptable for slower instruments, such as triple quadrupole mass analyzers. In some examples, the mass spectra are acquired using a SIM acquisition over an m/z range of about 30 to about 400 m/z, over an m/z range of about 30 m/z to about 350 m/z, over an m/z range of about 30 to about 300 m/z, or over an m/z range of about 30 m/z to about 250 m/z. It will be recognized that other acquisition techniques may be used, such as a full MS/MS or MSn acquisitions (where n is greater than two). In other examples, a targeted MS/MS acquisition (e.g., a selected reaction monitoring (SRM) acquisition, a multiple reaction monitoring (MRM), or a parallel reaction monitoring (PRM) acquisition) may be performed to acquire data on one or more known solvent system ions.

In some examples, operation 402 begins with emitter 208 positioned at a default home based on the particular instruments being used (e.g., the particular mass spectrometer, ion source, or emitter cartridge). Alternatively, the default home position is based on the particular experiment conditions (e.g., the particular target analyte or analytes, selected m/z, solvent conditions, sheath gas flow rate, and/or spray voltage). The default home position may be determined empirically, such as by performing method 400. In some examples, an emitter cartridge may include onboard nonvolatile memory that may store data representative of the default home position (coordinates) that may be read and used by position control system 214 to position emitter 208 at the initial position. Alternatively, position control system 214 may obtain the data representative of the default home position from a remote computing system.

In some examples, the search area that is sampled is a two-dimensional (2D) search area positioned in front of inlet 212. The search area is defined by a first axis and a second axis that is orthogonal to the first axis but remains at a fixed position along a third axis that is orthogonal to the first axis and second axis.

Figure 5A:
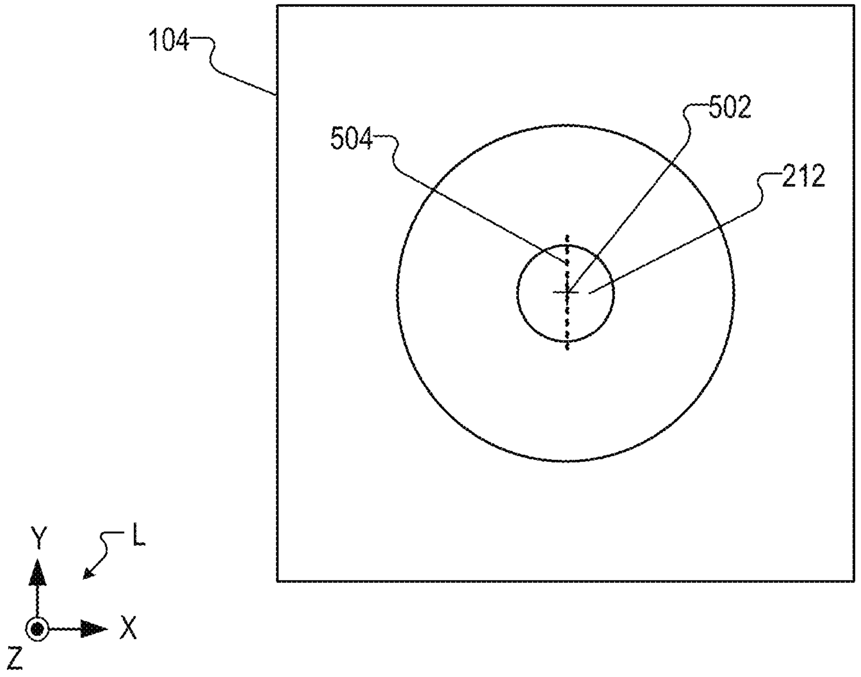
FIGS. 5A and 5B show an illustrative configuration of a two-dimensional search area relative to an inlet of a mass analyzer.
Figure 5B:
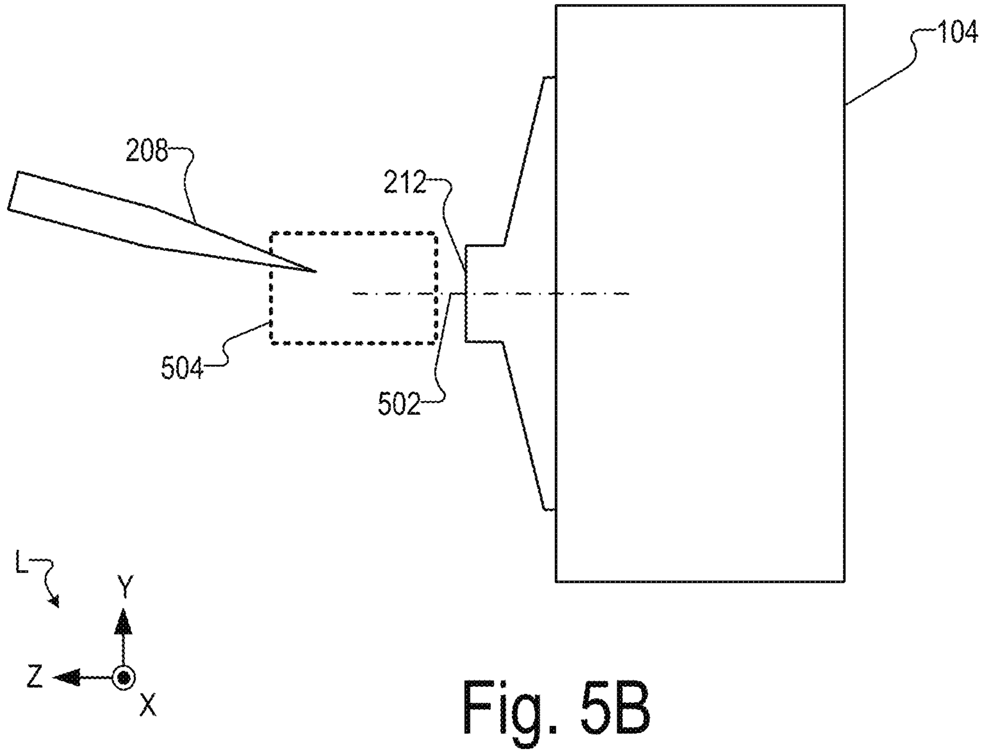

FIGS. 5A and 5B show an illustrative configuration of a 2D search area relative to inlet 212 of mass analyzer 104. FIG. 5A shows a front view of inlet 212 and FIG. 5B shows a side view of inlet 212 and emitter 208 positioned in front of inlet 212. A legend L has been arbitrarily oriented so that a Z-axis extends along a longitudinal axis 502 of inlet 212 (indicated by the "T" in FIG. 5A and the dash-dot-dash line of FIG. 5B), an X-axis extends horizontally (left to right in FIG. 5A), and a Y-axis extends vertically (up and down in FIGS. 5A and 5B). Emitter 208 is angled relative to longitudinal axis 502 of inlet 212 within a Y-Z plane.

As shown in FIGS. 5A and 5B, a search area 504 (indicated by the dashed line in FIG. 5A and the dashed line rectangle in FIG. 5B) is positioned in front of inlet 212. Search area 504 lies in a plane that extends along the Z-axis (a first axis) and the Y-axis (a second axis). In the example of FIGS. 5A and 5B, search area 504 is parallel to axis 502 of inlet 212 (e.g., parallel to the Z-axis (a third axis)). Search area 504 may have any suitable dimensions as may serve a particular implementation. In some examples, search area 504 has a length (along the Z-axis) and/or height (along the Y-axis) of about 0.5 millimeters (mm) to about 5.0 mm along the Z-axis and/or Y-axis. In further examples, search area 504 has a length and/or height of about 1.0 millimeters (mm) to about 3.0 mm. In yet further examples, search area 504 has a length and/or height of about 1.5 mm to about 2.5 mm.

Figure 6A:
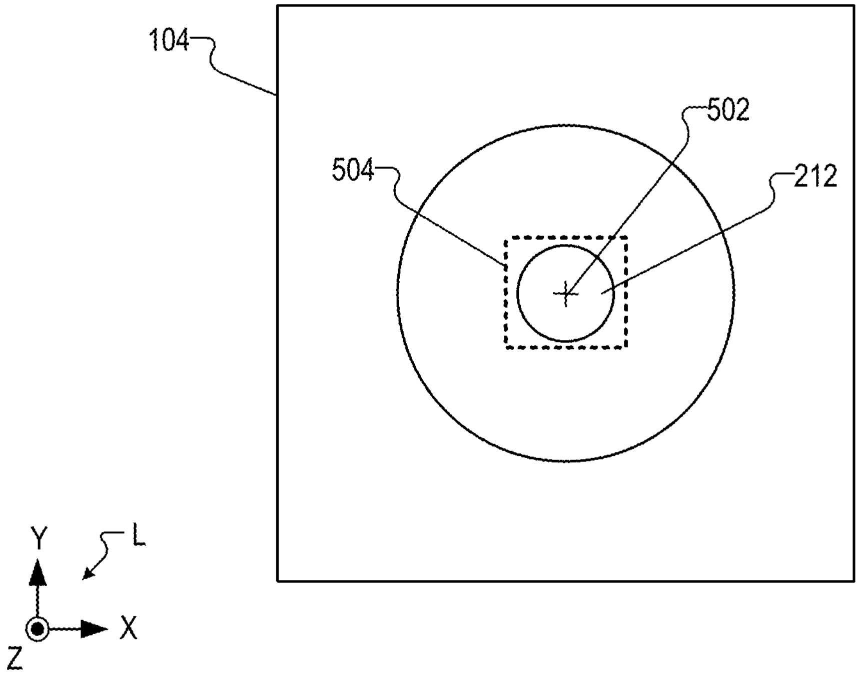
FIGS. 6A and 6B show another illustrative configuration of a two-dimensional search area relative to an inlet of a mass analyzer.
Figure 6B:
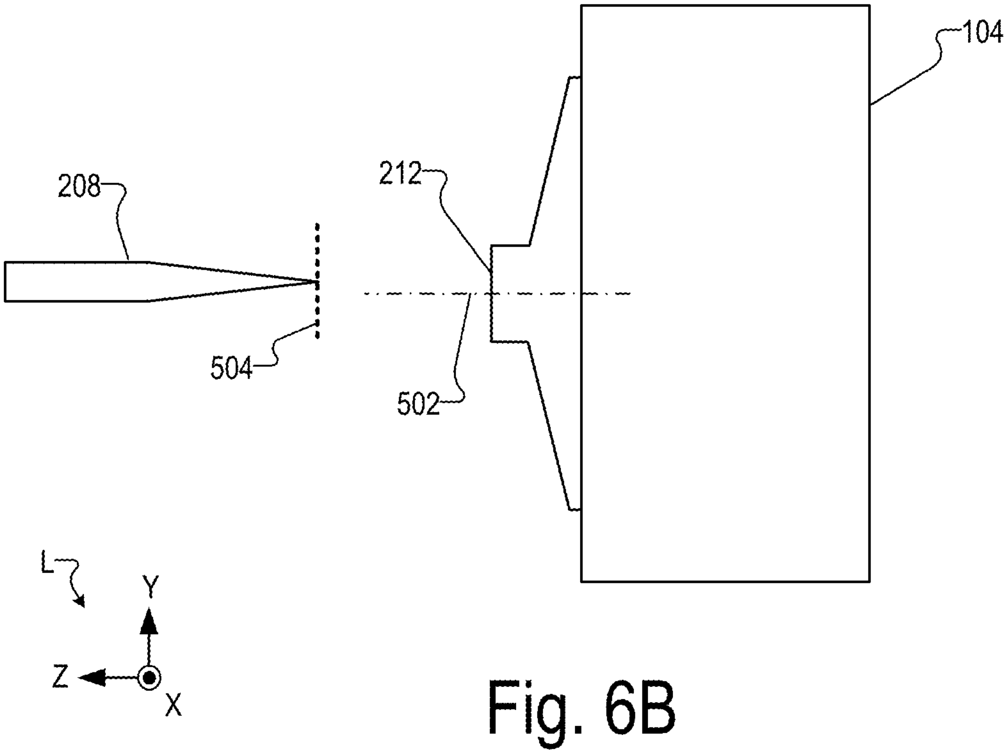

FIGS. 6A and 6B show another illustrative configuration of search area 504. FIGS. 6A and 6B are similar to FIGS. 5A and 5B except that, in FIGS. 6A and 6B, search area 504 (indicated by the dashed line rectangle in FIG. 6A and the dashed line in FIG. 6B) lies in a plane that extends along the X-axis (a first axis) and the Y-axis (a second axis). In the example of FIGS. 6A and 6B, search area 504 is orthogonal to axis 502 of inlet 212 (e.g., orthogonal to the Z-axis (a third axis)). Emitter 208 is not angled relative to longitudinal axis 502 of inlet 212.

Search area 504 may have any other suitable orientation, shape, and size as may serve a particular implementation. For example, search area 504 may be orthogonal to an axis of emitter 208 regardless of the position or orientation of emitter 208. In other examples, search area 504 is one-dimensional (1D) so that emitter 208 is sequentially positioned at a plurality of positions along only one direction. In further examples, search area 504 is three-dimensional (3D) so that emitter 208 is sequentially positioned at a plurality of positions within a 3D space. Additionally, search area 504 may have any other shape as may serve a particular implementation, such as circular, elliptical, triangular, irregular, etc.

As mentioned above, at operation 402 position control system 214 directs automated positioning system 202 to sequentially position emitter 208 at a plurality of positions within search area 504. The step size between adjacent or sequential positions may be fixed, chosen from a schedule, determined adaptively, and/or dynamically modified during method 400 in order to make method 400 robust against noise and/or to speed up the process. Any suitable step size may be used. As mentioned above, the detected signal may be overly sensitive to deviations of emitter 208 from an optimal position by a fraction of a millimeter (e.g., only 100 μm, or less than 100 μm). In some examples, automated positioning system 202 sequentially positions emitter 208 at each of the plurality of positions within search area 504 using a step size between about 1 μm and about 50 μm, between about 1 μm and about 25 μm, between about 1 μm and about 10 μm, or between about 2 μm and about 5 μm.

In some examples, position control system 214 may speed up the process of sampling search area 504 by taking double, triple, or larger step sizes. For example, using a step size of 2 μm, position control system 214 may sample search area 504 by positioning emitter 208 at a plurality of positions that are spaced 4 μm apart (a double step size) along both the first axis and the second axis, to thereby sample search area in a checkerboard pattern. In some examples, position control system 214 may estimate the signal value of skipped positions, such as by interpolation, based on the signal value of one or more neighboring sampled positions. It will be recognized that any suitable sampling pattern may be used.

While the set of mass spectra are acquired, search area 504 remains at a fixed position relative to inlet 212 along a third axis that is orthogonal to the first axis and the second axis (the "third axis position"). In the example of FIGS. 5A and 5B, emitter 208 is angled within the Y-Z plane relative to axis 502 of inlet 212. Accordingly, search area 504 remains at a fixed position along the X-axis (the third axis) while emitter 208 is sequentially positioned at a plurality of positions within the Y-Z plane. In the example of FIGS. 6A and 6B, emitter 208 is not angled with respect to axis 502 of inlet 212, and search area 504 remains at a fixed position along the Z-axis (the third axis) while emitter 208 is sequentially positioned at a plurality of positions within the X-Y plane.

Position control system 214 may determine the third axis position in any suitable way. In some examples, the third axis position is a default position for the particular instruments being used (e.g., the particular mass spectrometer, ion source, or emitter cartridge). In other examples, the third axis position is a default position for the particular experiment conditions (e.g., the particular target analyte or analytes, selected m/z, solvent conditions, sheath gas flow rate, and/or spray voltage). In some examples, an emitter cartridge may include onboard nonvolatile memory that may store data representative of the third axis position, which memory may be read and used by position control system 214 to position emitter 208 at the third axis position prior to performing operation 402. Alternatively, position control system 214 may obtain the data representative of the third axis position from a remote computing system. In some examples, the third axis position is indicated by the default home position described above.

Figure 7:
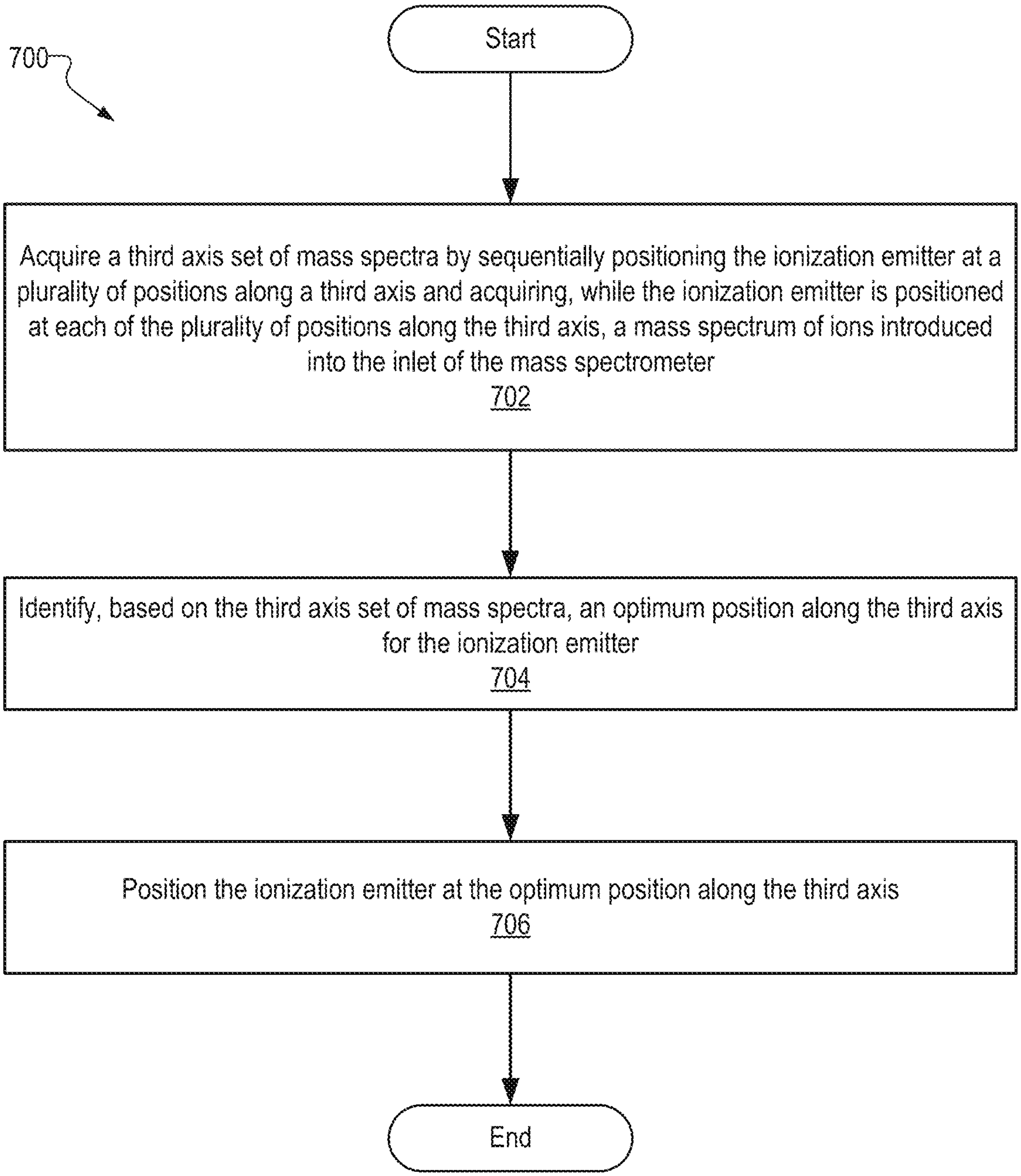
FIG. 7 shows an illustrative method for determining a fixed position of the search area relative to the inlet along a third axis that is orthogonal to the first axis and the second axis of the search area.

In other examples, the third axis position is determined by performing an optimization routine. FIG. 7 shows an illustrative method 700 for determining an optimum third axis position. Method 700 may be performed prior to performing method 400. While FIG. 7 shows illustrative operations according to one embodiment, other embodiments may omit, add to, reorder, and/or modify any of the operations shown in FIG. 7. Each operation of method 700 may be performed in any suitable way. Method 700 is performed prior to performing method 400.

At operation 702, position control system 214 acquires a third axis set of mass spectra by directing automated positioning system 202 to sequentially position emitter 208 at a plurality of positions along the third axis and acquiring, while emitter 208 is positioned at each of the plurality of positions along the third axis, a mass spectrum of ions introduced into inlet 212. The ions introduced into inlet 212 include ions emitted from the emitter 208 (e.g., solvent ions) and, in some cases, ambient ions present in the environment near emitter 208 and/or inlet 212. Position control system 214 acquires the third axis set of mass spectra while maintaining emitter 208 at a fixed position along the first axis and the second axis. The fixed position along the first axis and the second axis may be determined in any suitable way, such as manually or based on a default position. Most reasonable emitter positions along the first axis and the second axis enable determination of an optimum position along the third axis.

In the example of FIGS. 5A and 5B, emitter 208 is positioned at a plurality of positions along the X-axis (the third axis) while remaining at a fixed position along the Z-axis (the first axis) and the Y-axis (the second axis). In the example of FIGS. 6A and 6B, emitter 208 is positioned at a plurality of positions along the Z-axis (the third axis) while remaining at a fixed position along the X-axis (the first axis) and the Y-axis (the second axis).

At operation 704, position control system 214 identifies, based on the third axis set of mass spectra, an optimum position along the third axis for the ionization emitter. For example, position control system 214 may identify the optimum position along the third axis as the position that resulted in an optimum signal (e.g., the most intense signal). Position control system 214 may assign the optimum position as the third axis position.

At operation 706, position control system 214 directs automated positioning system 202 to move emitter 208 to the third axis position. Position control system 214 may then initiate method 400 to identify an optimum emitter position along the first axis and the second axis.

Referring again to FIG. 4, at operation 404 position control system 214 generates, based on the set of mass spectra, an ion intensity map. The ion intensity map includes a set of data that represents the detected intensity of one or more of the ions introduced into inlet 212 of mass spectrometer 100 as a function of the position of emitter 208. Illustrative examples of ion intensity maps and methods of generating ion intensity maps will be described below in more detail.

At operation 406, position control system 214 identifies, based on the ion intensity map, an optimum position for the ionization emitter. For example, position control system 214 may select as the optimum position any position within the search area at which the signal of the ion intensity map has an optimum value. For example, the optimum position may be a position within the search area at which the ion intensity map has the highest intensity value.

At operation 408, position control system 214 positions emitter 208 at the optimum position (e.g., directs automated positioning system 202 to position emitter 208 at the optimum position). An analytical experiment may then be carried out with emitter 208 at the optimum position. In some examples, position control system 214 automatically positions emitter 208 at the optimum position upon completion or termination of method 400. In other examples, position control system 214 may provide, for display on a graphical user interface associated with position control system 214, information indicating the optimum position or multiple optimum positions if there are more than one optimum position. A user may then provide user input to authorize repositioning of emitter 208 to the optimum position and/or to select an optimum position among multiple optimum positions. In response to receiving the user input, position control system 214 may then move (e.g., direct automated positioning system 202 to move) emitter 208 to the optimum position approved or selected by the user input.

In some examples, upon terminating method 400, position control system 214 stores data representative of the optimum emitter position in the onboard memory of the emitter cartridge and/or in a storage facility of mass spectrometer 100 and/or position control system 214. Additionally or alternatively, position control system 214 may transmit the data representative of the optimum emitter position to a remote computing system, which may use the data alone or in combination with data received from other optimizations to establish a default home position for the particular instrument and/or experiment conditions.

In some examples, method 400 is performed in response to receipt of user input. For example, prior to performing an analytical experiment to analyze one or more analytes, a user may select an emitter position optimization button presented on a graphical user interface associated with the mass spectrometer. In response to user selection of the emitter position optimization button, position control system 214 may begin performing method 400 and/or method 700. In other examples, a user may select the emitter position optimization button on the graphical user interface during an analytical run to re-calibrate the emitter position. In some examples, the user may recalibrate the emitter position during a column equilibration step (e.g. while an LC column is equilibrated with the mobile phase) or during a column wash step.

Various illustrative examples of an ion intensity map and methods of generating an ion intensity map (operation 404) and identifying an optimum emitter position based on the ion intensity map (operation 406) will now be described.

In some examples, the ion intensity map is a total ion map. A total ion map represents or indicates the total signal (e.g., a summed intensity or a total ion current) of all ions detected at each emitter position. A total ion map may be generated by summing, for each position of the plurality of positions within the search area, the detected intensity signals of all ions represented in each respective mass spectrum. In embodiments that use a total ion map, it is assumed that most or all of the ions that enter inlet 212 are proxy ions and that the presence of contaminant ions is negligible.

Figure 8:
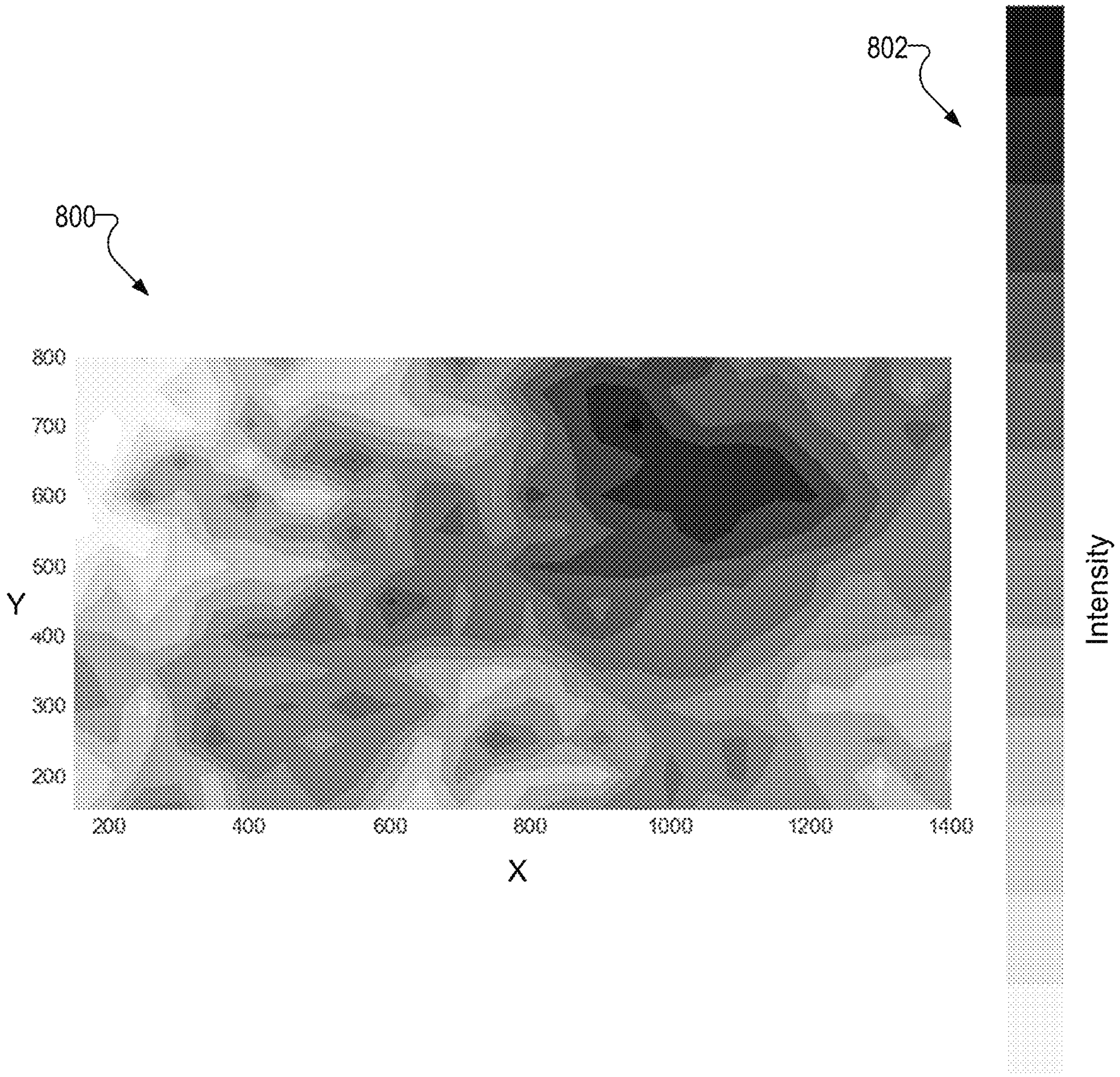
FIG. 8 shows a graph that depicts an illustrative total ion map that may be generated from a set of mass spectra acquired by sampling the search area of FIGS. 6A and 6B.

FIG. 8 shows a graph 800 that depicts an illustrative total ion map that may be generated from a set of mass spectra acquired by sampling search area 504 of FIGS. 6A and 6B. As shown in graph 800, the total ion map indicates the total (e.g., summed) intensity at each (X, Y) coordinate position of emitter 208. As indicated by a legend 802, darker positions of graph 800 indicate higher intensity levels while lighter positions indicate lower intensity levels. As can be seen in graph 800, the emitter position with the highest total intensity level is at a (X, Y) coordinate position of about (950, 700). Accordingly, position control system 214 may identify position (950, 700) as the optimum emitter position and move emitter 208 to the identified optimum emitter position. It will be recognized that the total ion map (and any other ion intensity map described herein) comprises the underlying data that may be used to generate graph 800 shown in FIG. 8 (or any other graphical depiction herein of an ion intensity map), and that position control system 214 need not generate a graph or other graphical depiction of a total ion map (or any other ion intensity map) in order to perform any of the methods described herein, including method 400 and method 700.

In other examples, the ion intensity map referred to in operations 404 and 406 is an extracted ion map. An extracted ion map represents the intensity (e.g., summed intensity) as a function of emitter position for only a selected subset of ions. In these examples, the signals from various ions are filtered out so that the ion intensity map is generated, and hence the optimum position is determined, based largely or entirely on signals corresponding to proxy ions.

An extracted ion map may be configured and generated in various different ways. In some examples, an extracted ion map comprises a set of data that represents the total intensity of a set of the most intense signals in each respective mass spectrum as a function of emitter position. In these examples, it is assumed that contaminant ions generally have lower signal levels than proxy ions, so the contaminant ion signal levels can largely or entirely be excluded by generating the extracted ion map using only the signals from a set of the most abundant ions detected at each emitter position. In some implementations, the extracted ion map is generated by summing the intensity signals of the most intense signals in each respective mass spectrum (e.g., the N most intense signals, where N is an integer ranging from 3 to 20, from 5 to 15, or any other suitable number). Proxy ions are assumed to produce the highest intensity signals, but there may be scenarios in which signals produced by contaminant ions are also included in the set of the most intense signals. However, it is assumed that the contaminant ion signals are negligible as compared with the proxy ion signals and that the summed intensity of the most intense signals gives a fairly accurate representation of the behavior of analyte ions.

In other examples, an extracted ion map represents, as a function of emitter position, the total intensity of signals for a set of ions having an m/z value less than a threshold m/z value. In these examples, contaminant ions are generally assumed to have an m/z value greater than the threshold m/z value. In many cases, contaminant ions, such as polysiloxanes, have an m/z value greater than about 300 m/z. In some examples, the threshold m/z value is a value between about 250 m/z and 400 m/z. In other examples, the threshold m/z value is a value between about 275 m/z and 375 m/z. In other examples, the threshold m/z value is a value between about 300 m/z and 350 m/z. The threshold m/z value may be any other value and may be set based on knowledge of the particular environment in which the experiment is performed (e.g., based on the m/z of contaminant ions known to be present) and/or based on knowledge of the particular solvent system. By generating the ion intensity map based only on signals having an m/z value that is less than the threshold m/z value, a large portion of the signals from contaminant ions may be excluded when generating the ion intensity map.

In other examples, an extracted ion map represents the signal intensity as a function of emitter position for a set of one or more selected ions (e.g., one or more selected m/z). For example, the selected ions may be proxy ions (e.g., solvent ions) that are known to originate from the mobile phase. Thus, position control system 214 may optimize the emitter position based on analysis of one or a few specific proxy ions.

In other examples, an extracted ion map is generated based on a classification of one or more ions to filter out contaminant ions from the extracted ion map. For example, an extracted ion map may represent a total intensity of all signals for a set of ions that does not include ions classified as contaminant ions. In these examples, position control system 214 may perform a classification process to classify one or more detected ions as contaminant ions and generate the extracted ion map based only on signals for ions that are not classified as contaminant ions. For instance, position control system 214 may generate the extracted ion map by summing, for each emitter position, the intensity values of the signals for all ions that are not classified as contaminant ions. In other examples, the extracted ion map may represent a total intensity of all signals for a set of ions that includes only ions classified as proxy ions. In these examples, position control system 214 may perform a classification process to classify one or more detected ions as proxy ions and generate the extracted ion map based only on signals for the proxy ions. For example, position control system 214 may generate the extracted ion map by summing, for each emitter position, the intensity values of the signals for all proxy ions.

In some examples, position control system 214 performs the classification process on all detected ions. In other examples, position control system 214 performs the classification process on only a subset of the detected ions. For example, position control system 214 may perform the classification process on only a set of the most abundant ions (e.g., based on each ion's total intensity across all emitter positions), all ions having an intensity value at any emitter position greater than a threshold intensity value, or all ions having an m/z value within a threshold m/z range (e.g., less than a threshold m/z value, greater than a threshold m/z value, within a target m/z range (e.g., 30 to 300 m/z), etc.).

Figure 9:
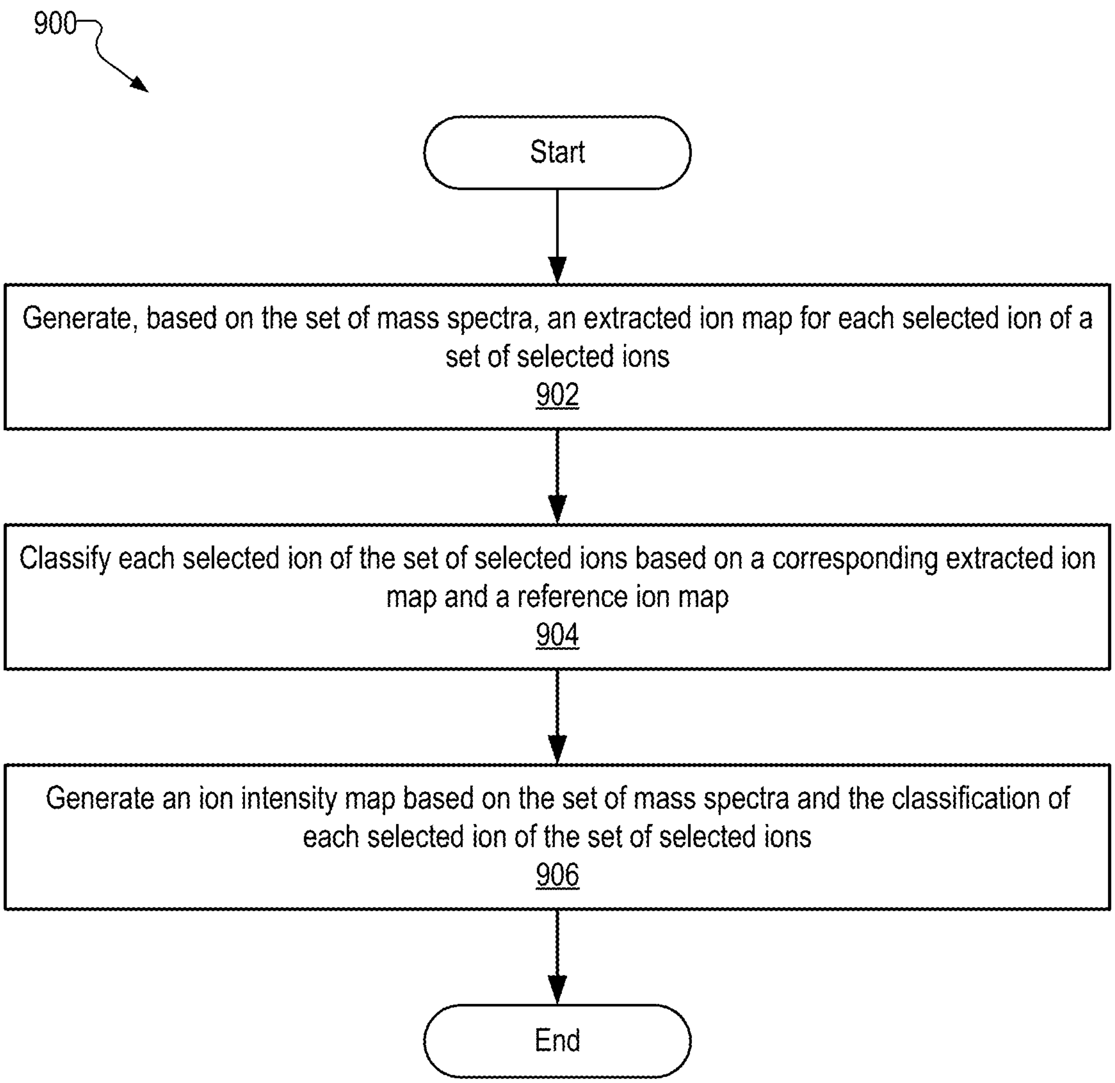
FIG. 9 shows a flowchart of an illustrative ion classification process.

Illustrative classification processes will now be described. FIG. 9 shows a flowchart of an illustrative classification process 900. While FIG. 9 shows illustrative operations according to one embodiment, other embodiments may omit, add to, reorder, and/or modify any of the operations shown in FIG. 9. Each operation of classification process 900 may be performed in any suitable way. In some examples, classification process 900 implements operation 404 of method 400.

At operation 902, position control system 214 generates, based on the set of mass spectra acquired at operation 402 of method 400, an extracted ion map for each selected ion (e.g., each selected m/z) of a set of selected ions. The set of selected ions may include all ions detected in the set of mass spectra or a subset of one or more detected ions (e.g., a set of the N most abundant ions, a set of ions within a defined m/z range, a particular known contaminant ion, etc.). Each extracted ion map represents intensity as a function of emitter position for the corresponding selected ion. Position control system 214 may generate the extracted ion map for each selected ion by extracting intensity values for only the selected ion from the set of mass spectra.

Figure 10:
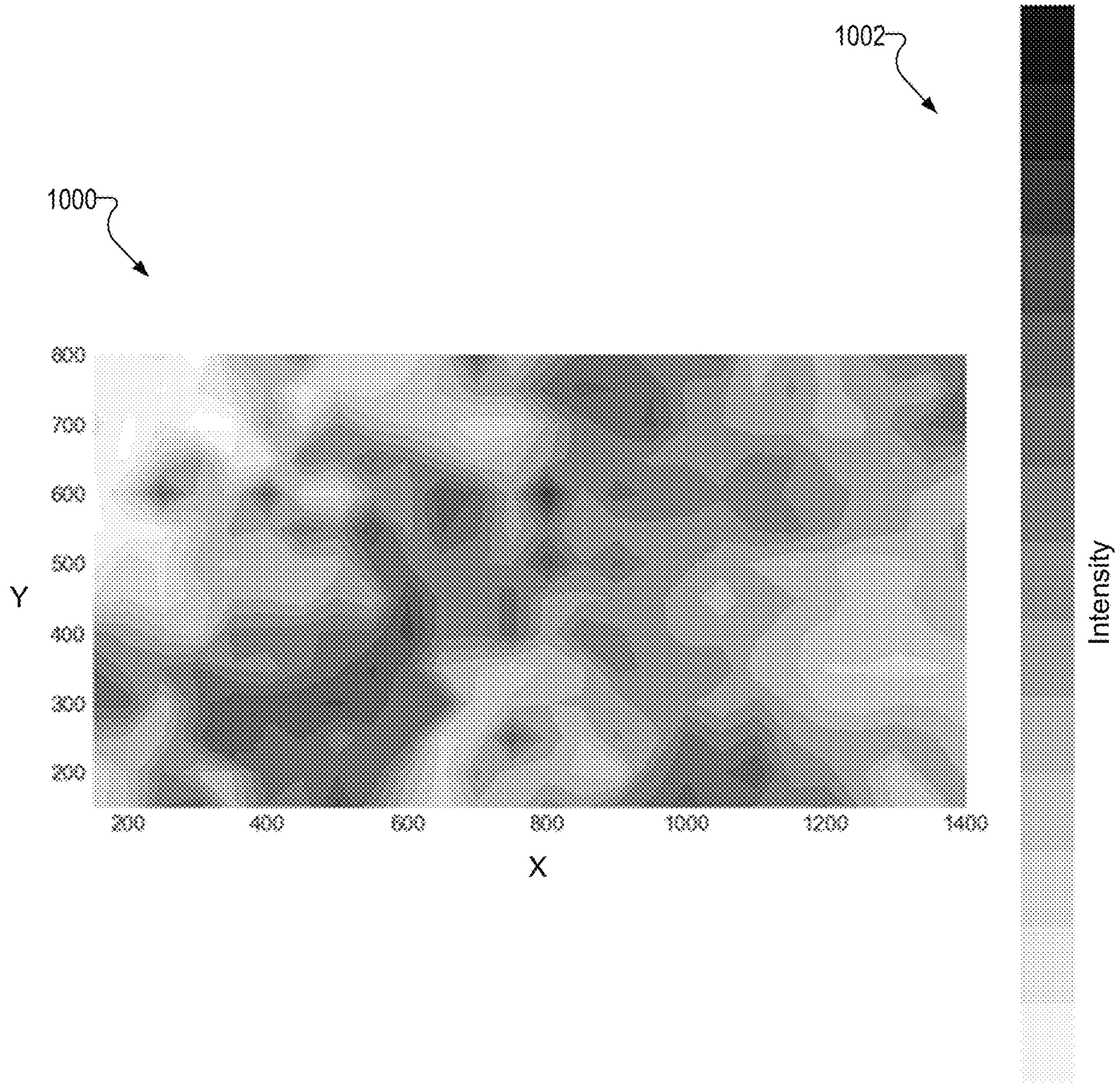
FIG. 10 shows a graph that depicts an illustrative extracted ion map for a selected ion (m/z 371) corresponding to a contaminant ion.

FIG. 10 shows a graph 1000 that depicts an illustrative extracted ion map for a selected ion (m/z 371), which corresponds to a common polysiloxane contaminant ion. The extracted ion map depicted by graph 1000 may be generated from the set of mass spectra acquired by sampling search area 504 of FIGS. 6A and 6B. As shown in graph 1000, the extracted ion map indicates the intensity value for the selected ion at each (X, Y) coordinate position of emitter 208. As indicated by a legend 1002, darker positions indicate higher intensity levels while lighter positions indicate lower intensity levels. As can be seen, there is no clear optimal position of emitter 208 due to the fact that the selected ion corresponds to a contaminant ion and not a proxy ion originating from emitter 208.

Returning again to FIG. 9, at operation 904, position control system 214 classifies each selected ion based on its corresponding extracted ion map and a reference ion map. In some examples, a reference ion map is an ion intensity map that represents the detected intensity values for one or more proxy ions (e.g., for a reference m/z or a reference m/z range, such as 30-300 m/z) or analyte ions. The reference ion map excludes intensity values for contaminant ions. Thus, the reference ion map shows an intensity pattern that should be expected to be achieved by proxy ions. In some examples, the reference ion map is generated based on a reference set of mass spectra acquired prior to acquiring the set of mass spectra (from which the extracted ion map is generated). The reference set of mass spectra and/or reference ion map for the reference m/z or reference m/z range may be generated by a manufacturer and/or may be accessed by position control system 214 from a remote computing system. The reference set of mass spectra may be acquired in an environment that is substantially free of ambient molecules that produce the contaminant ions. Additionally or alternatively, the reference set of mass spectra may be generated by removing any signals corresponding to known contaminant ions from the reference set of mass spectra.

Figure 11:
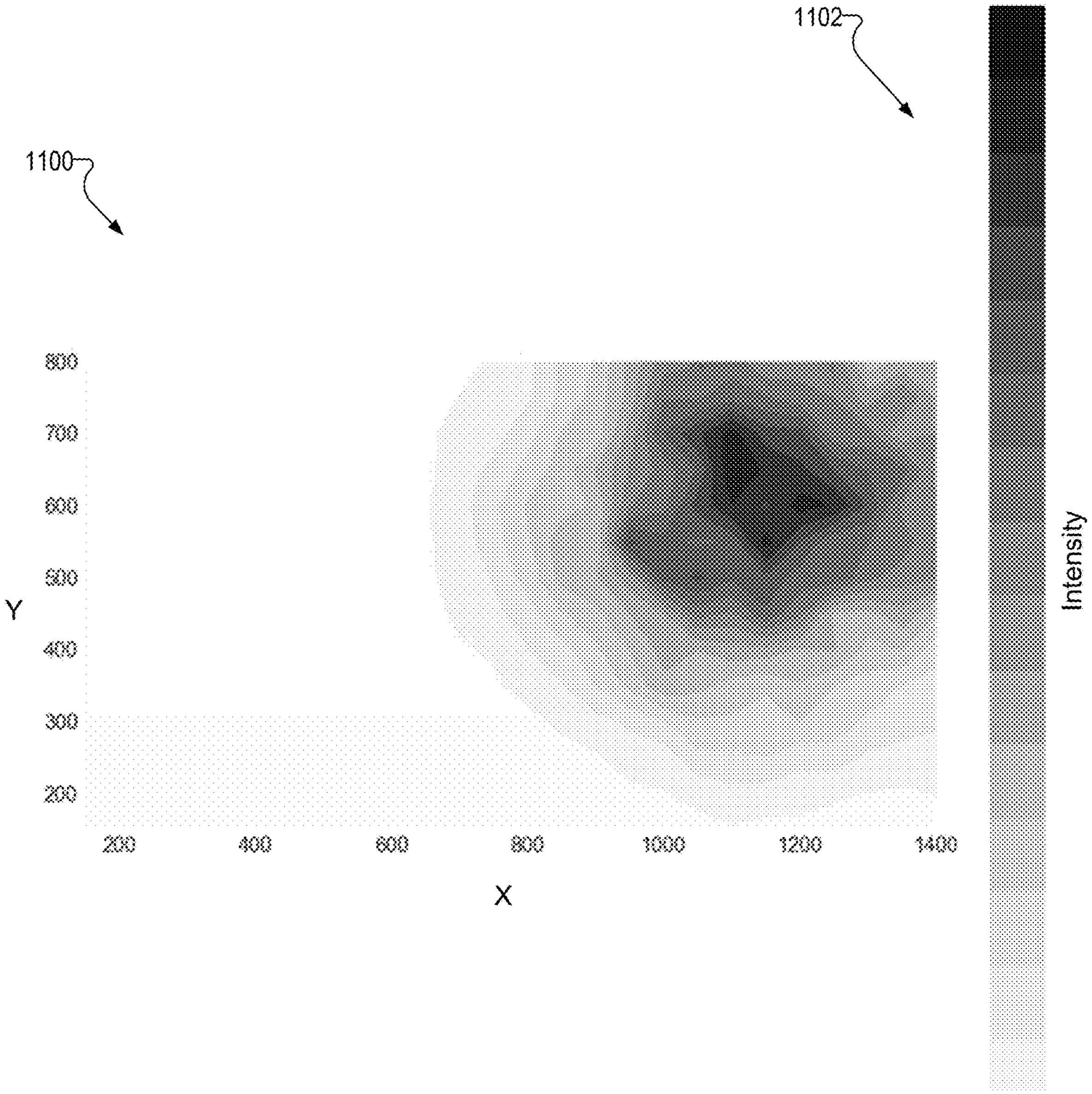
FIG. 11 shows a graph that depicts an illustrative reference ion map.

FIG. 11 shows a graph 1100 that depicts an illustrative reference ion map. The reference ion map depicted by graph 1100 may be generated from a reference set of mass spectra acquired by sampling a search area near an inlet to a mass spectrometer. As shown in graph 1100, the reference ion map indicates the intensity value at each (X, Y) coordinate position of the emitter 208. As indicated by a legend 1102, darker positions indicate higher intensity levels while lighter positions indicate lower intensity levels. As can be seen in graph 1100, the optimal position of emitter 208 should occur at or near a (X, Y) coordinate position of (1100, 650).

In some examples, position control system 214 may perform a calibration step to align the reference ion map with the extracted ion map for the selected ion map because the reference ion map is generated using a different instrument setup and may have offsets in coordinate space. The calibration may be performed in any suitable way, such as based on pattern recognition using the extracted ion map, another extracted ion map acquired from the set of mass spectra, and/or based on the default home position for the set of mass spectra.

Position control system 214 may classify a selected ion based on its corresponding extracted ion map and the reference ion map using classification rules. Classification rules specify which classification criteria are applied and how the classification criteria are applied. Classification criteria are based on classification parameters that indicate or represent a degree of similarity between an extracted ion map and the reference ion map. Illustrative classification parameters include, without limitation, a cross-correlation coefficient, a matrix norm-to-mean ratio, a difference (distance) in an optimum position along the first axis (e.g., the Z-axis), a difference (distance) in an optimum position along the second axis (e.g., the Y-axis), a total difference (distance) in an optimum position (e.g., a total distance based on both the first axis difference and the second axis difference components), a result of a linear discriminant analysis, and a result of a principal component analysis. The value of a classification parameter may be determined using one or more statistical comparison techniques, such as a cross-correlation, optimum position difference, a linear discriminant analysis, and a principal component analysis. Additionally or alternatively, one or more classification criteria may be based on a comparison performed using a trained machine learning model (e.g., a trained neural network), a random forest algorithm, and/or a support vector machine.

A classification criterion is satisfied when the respective classification parameter determined by position control system 214 satisfies a predetermined condition (e.g., a minimum, maximum, or other value of the classification parameter). For example, a cross-correlation criterion may be satisfied when the cross-correlation coefficient is greater than a minimum cross-correlation threshold value, a matrix norm-to-mean ratio criterion may be satisfied when the matrix norm-to-mean ratio is greater than a minimum matrix norm-to-mean ratio threshold value, and a Z-axis difference, Y-axis difference, and/or total difference criterion may be satisfied when the calculated difference is less than a maximum distance threshold value.

As mentioned, the classification rules specify which classification criteria are applied and how the classification criteria are applied to classify a selected ion. The set of classification criteria may include any combination of classification criteria as may suit a particular implementation. In some examples, the set of classification criteria includes at least a cross-correlation criterion and a matrix norm-to-mean ratio criterion. The set of classification criteria may be applied in any suitable way.

For example, position control system 214 may classify a selected ion as a contaminant ion in response to a determination that a threshold number (e.g., one, two, three, one-half, more than one-half, all, etc.) of the applied classification criteria are not satisfied. For instance, assume that the classification rules apply a cross-correlation criterion, a matrix norm-to-mean ratio criterion, a Z-axis difference criterion, and a Y-axis difference criterion, and that all classification criteria must be satisfied or the selected ion is classified as a contaminant ion. If position control system 214 determines that any one of the classification criteria is not satisfied (e.g., the matrix norm-to-mean ratio criterion is less than the minimum matrix norm-to-mean threshold value), position control system 214 classifies the selected ion as a contaminant ion. On the other hand, if position control system 214 determines that all of the classification criteria are satisfied, position control system 214 does not classify the selected ion as a contaminant ion.

As another illustration, if the classification rules specify that the threshold number of classification criteria that must be satisfied is two (or one-half) and position control system 214 determines that fewer than two (e.g., one or none)

classification criteria are satisfied, position control system 214 classifies the selected ion as a contaminant ion. On the other hand, if position control system 214 determines that any two or more classification criteria are satisfied, position control system 214 does not classify the selected ion as a contaminant ion.

In the examples described above, position control system 214 classifies ions as either contaminant ions or not contaminant ions. Such classification may be used when the extracted ion map excludes ions classified as contaminant ions. In other examples, position control system 214 may additionally or alternatively classify ions as proxy ions. Such classification may be useful when the extracted ion map is based only on ions classified as proxy ions. In some examples, position control system 214 classifies a selected ion as a proxy ion in response to a determination that a threshold number (e.g., one, two, three, one-half, more than one-half, all, etc.) of the applied classification criteria are satisfied.

In some examples, ions that are not classified as contaminant ions are therefore classified as proxy ions, or ions that are not classified as proxy ions are therefore classified as contaminant ions. In other examples, the classification rules may allow some gray area in which some ions are not positively classified as either contaminant ions or proxy ions. For example, a cross-correlation coefficient greater than a first threshold may indicate a proxy ion, a cross-correlation coefficient less than a second threshold may indicate a contaminant ion, and a cross-correlation coefficient between the first threshold and the second threshold may indicate an unclassified ion (e.g., a gray area ion). Such unclassified ions may be used to generate extracted ion maps that exclude only contaminant ions, but would not be used to generate extracted ion maps based only on proxy ions.

The classification rules and/or any particular parameters of each classification criterion may be manually set or selected by a user, may be set by default (e.g., established by a manufacturer), or may be set automatically based on various factors such as instrument type, experiment conditions, and/or environment conditions.

In some examples, position control system 214 may present the ion classifications to a user (e.g., by way of a graphical user interface) and/or the extracted ion intensity map for one or more ions and receive user input indicating which ions to include when generating the ion intensity map (e.g., user input to classify or reclassify one or more selected ions). In further examples, position control system 214 does not classify a selected ion but instead presents a similarity score determined based on the comparison of the extracted ion map for the selected ion with a reference ion map (e.g., the value of one or more classification parameters), and receives user input classifying the selected ion.

Referring again to FIG. 9, at operation 906 position control system generates an ion intensity map (e.g., an extracted ion map) based on the set of mass spectra and the classification of each selected ion of the set of selected ions. For example, position control system 214 may generate an extracted ion map based only on ions not classified as contaminant ions or based only on ions classified as proxy ions.

Having classified one or more ions and generated an ion intensity map based on the set of mass spectra and the classification of one or more selected ions (operation 906), position control system 214 performs operation 406 of method 400 to identify an optimum position for emitter 208 based on the ion intensity map generated at operation 906.

Using the classification rules described above (e.g., based on a comparison of the extracted ion map of FIG. 10 (m/z 371) with the reference ion map of FIG. 11), position control system 214 may classify the selected ion (m/z 371) as a contaminant ion. Accordingly, position control system 214 may exclude the extracted ion map of FIG. 10 when generating the ion intensity map that will be used to optimize the position of emitter 208.

Figure 12:
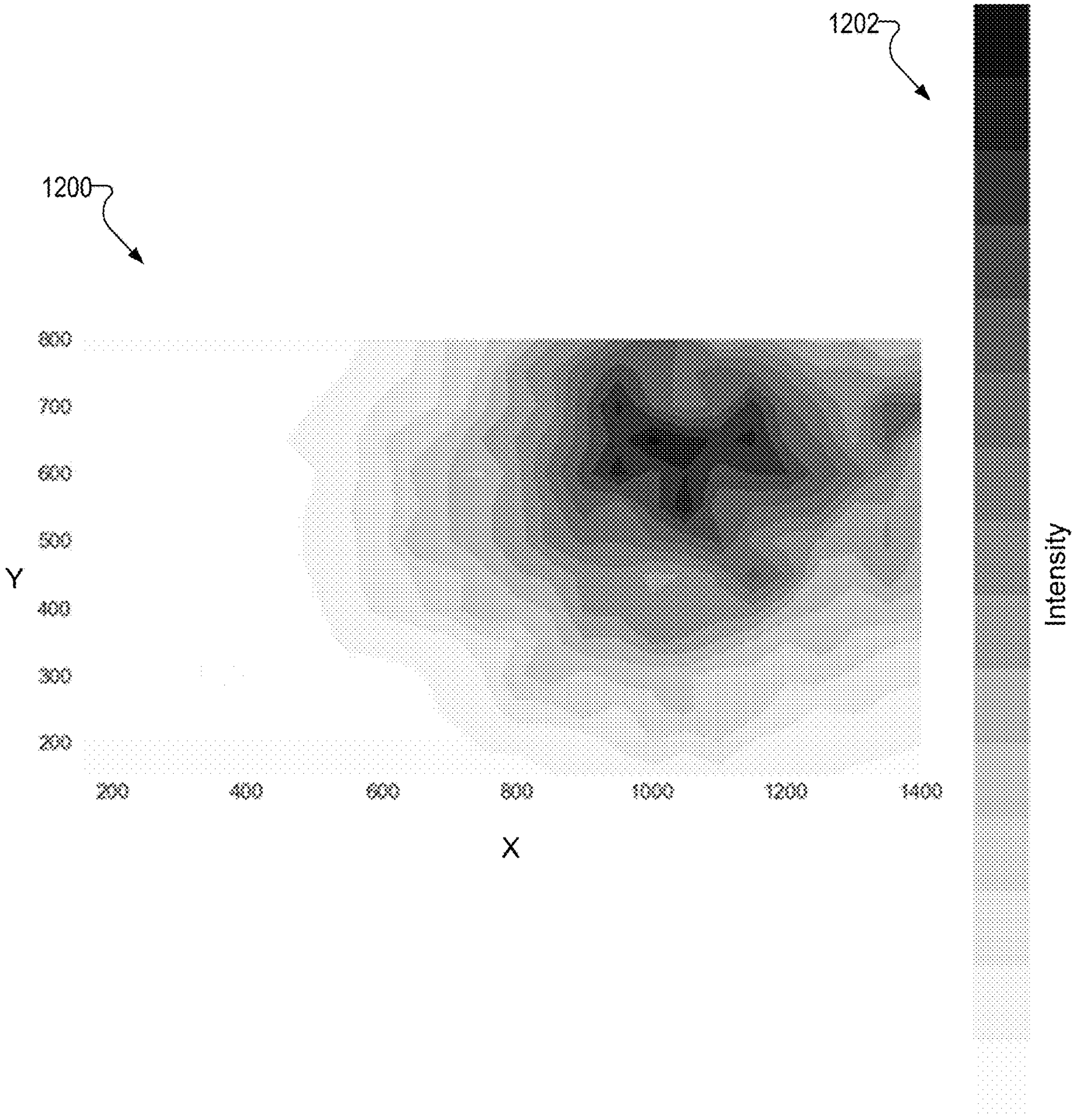
FIG. 12 shows a graph that depicts an illustrative extracted ion map for another selected ion (m/z 136) corresponding to a proxy ion.

FIG. 12 shows a graph 1200 that depicts an illustrative extracted ion map for another selected ion (m/z 136). The extracted ion map depicted by graph 1200 may be generated from the set of mass spectra acquired by sampling search area 504 of FIGS. 6A and 6B. As shown in graph 1200, the extracted ion map indicates the intensity value for m/z 136 at each (X, Y) coordinate position of emitter 208. As indicated by a legend 1202, darker positions indicate higher intensity levels while lighter positions indicate lower intensity levels. Using the classification rules described above (e.g., based on a comparison of the extracted ion map of FIG. 12 (m/z 136) with the reference ion map of FIG. 11), position control system 214 does not classify the selected ion (m/z 136) as a contaminant and/or classifies the selected ion as a proxy ion. Accordingly, position control system 214 includes the extracted ion map of FIG. 12 when generating the ion intensity map that will be used to optimize the position of emitter 208.

In the ion classification examples described above, the reference ion map is generated based on a reference set of mass spectra. In other examples, the reference ion map is an ion map generated from the set of mass spectra. For instance, the reference ion map may be a total ion map that represents the signals of all detected ions for the experiment. Alternatively, the reference ion map may be an extracted ion map that represents the signals of a subset of detected ions (e.g., all ions having an m/z less than a threshold amount, such as 300 m/z). Position control system 214 may classify a selected ion based on an extracted ion map for the selected ion and the reference ion map in any way described above. With this classification, position control system 214 may identify signals that do not behave like the overall signal patterns that are observed and classify the ions producing such anomalous signals as contaminant ions.

In the ion intensity maps represented in FIGS. 11 and 12, the signal intensity has a localized (e.g., circular) cloud distribution, which may occur when a sheath gas is not used. When a sheath gas is used, the signal intensity may have a substantially linear or elongated cloud distribution due to the ion transport function of the sheath gas. This fact may be utilized to classify ions that do not have a similar pattern. For example, position control system 214 may identify a linear cloud pattern in the total ion map (the reference ion map) and classify as contaminant ions any ions having an extracted ion map that does not have a similar linear cloud pattern.

Figure 13:
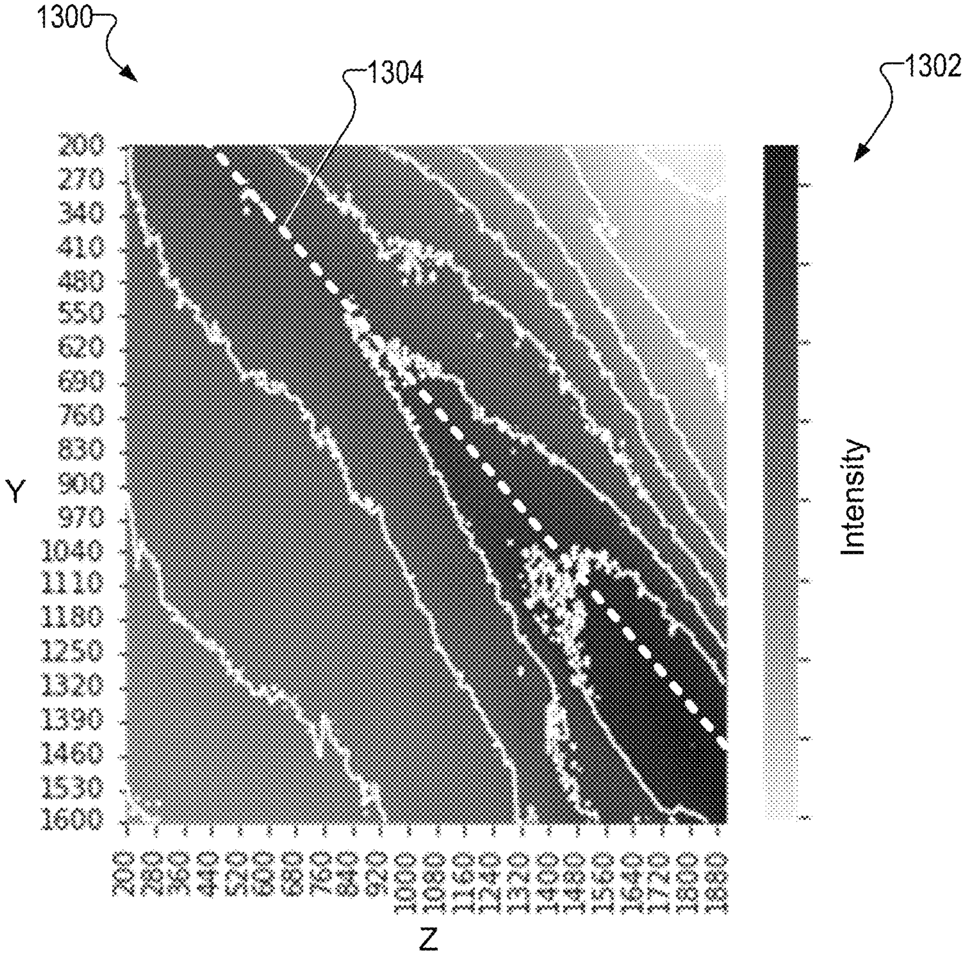
FIG. 13 shows a graph that depicts an illustrative total ion map having a linear cloud distribution.

FIG. 13 shows a graph 1300 that depicts an illustrative total ion map having a linear cloud distribution. The total ion map depicted by graph 1300 may be generated from the set of mass spectra acquired by sampling search area 504 of FIGS. 5A and 5B. As shown in graph 1300, the total ion map indicates the total intensity value at each (Z, Y) coordinate position of emitter 208. As indicated by a legend 1302, darker positions indicate higher intensity levels while lighter positions indicate lower intensity levels. As can be seen in graph 1300, the regions of highest intensity form a substantially linear cloud distribution, as marked by the dashed line 1304 centered on the linear cloud.

The linear cloud distribution that results from the use of a sheath gas, as illustrated in FIG. 13, may be utilized to perform a quick emitter position optimization process without mapping the entire search area. An illustrative quick optimization process will now be described with reference to FIGS. 14 and 15.

Figure 14:
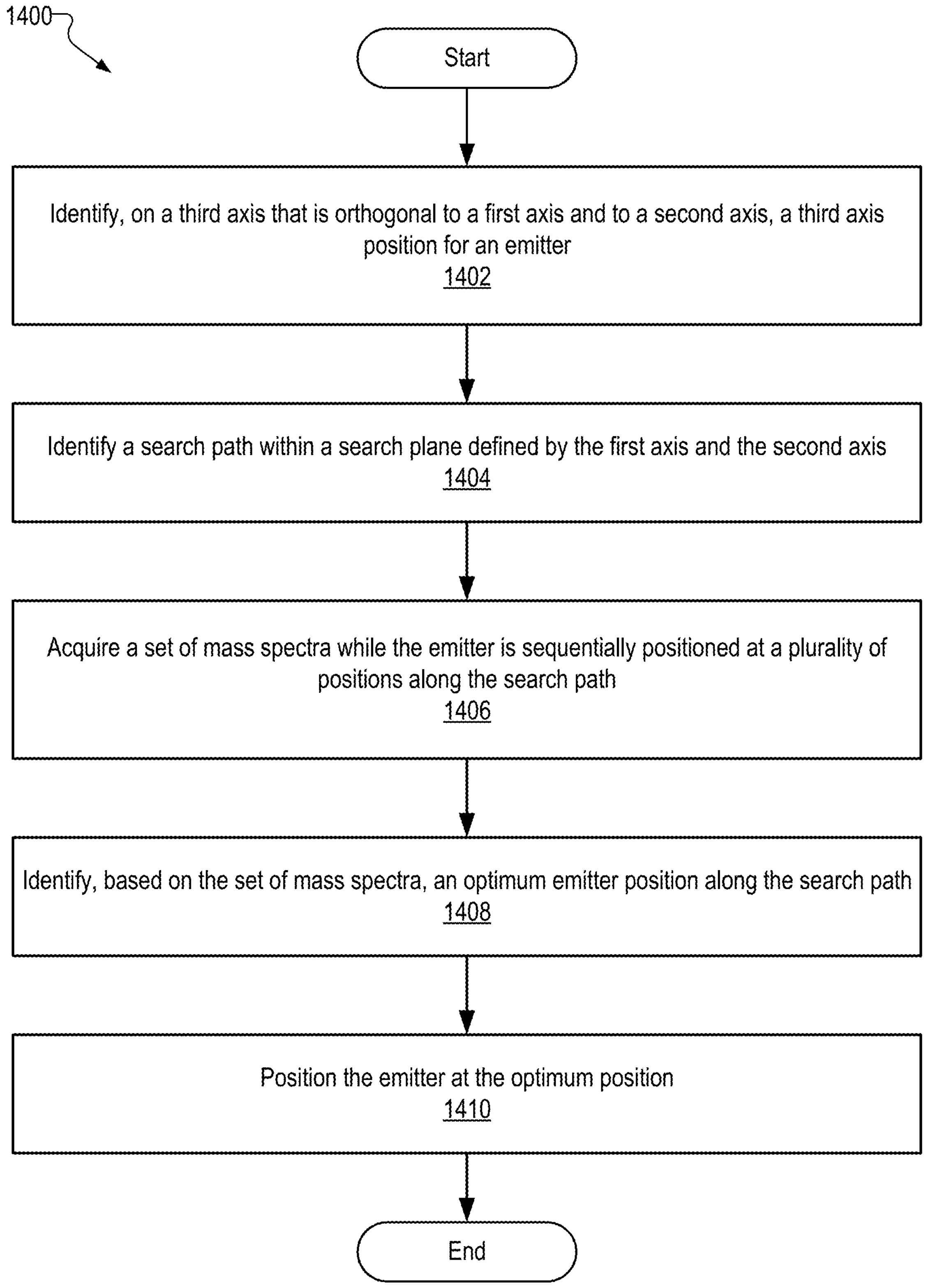
FIG. 14 shows a flowchart of an illustrative method for performing a quick optimization process.
Figure 15:
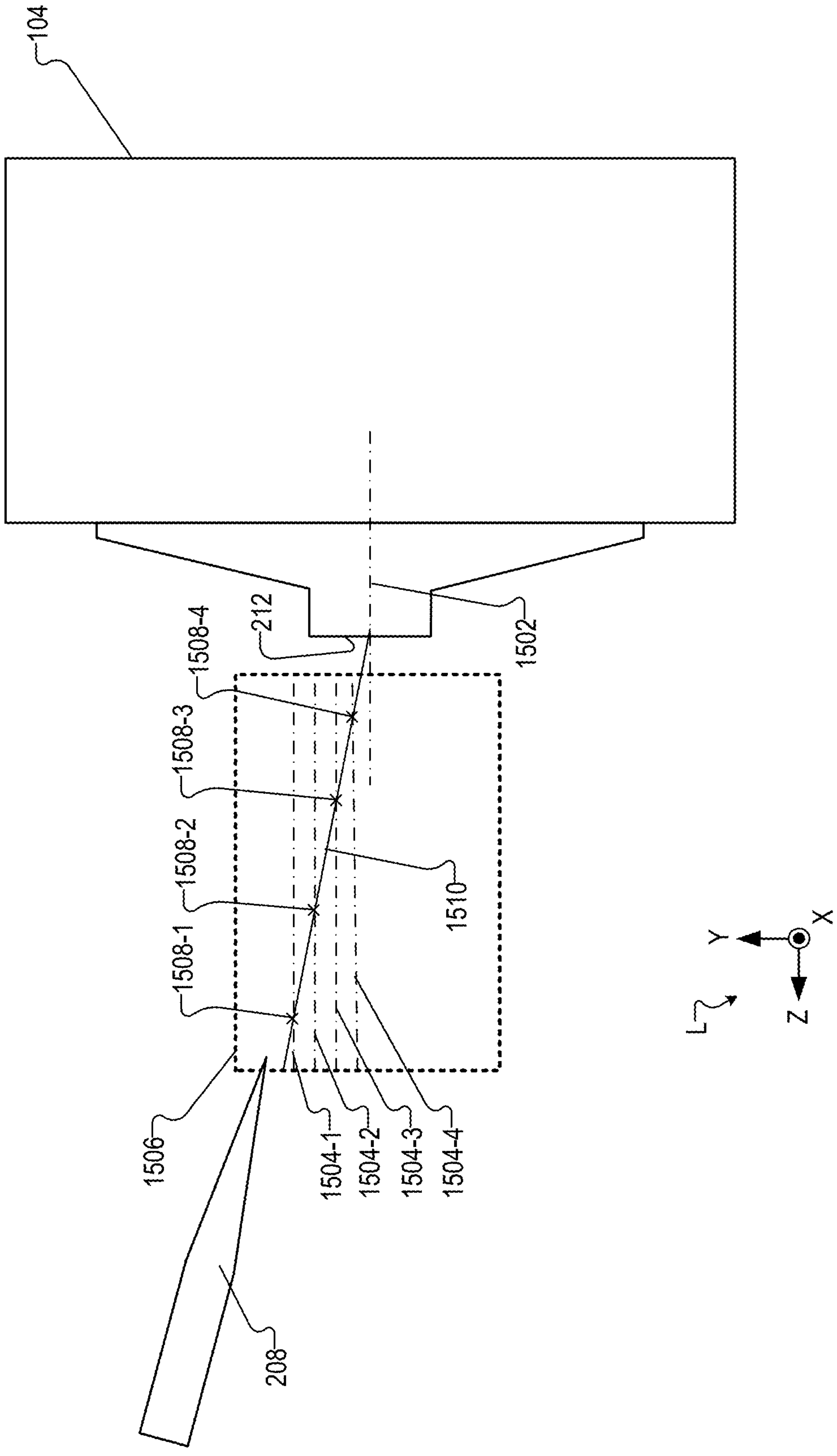
FIG. 15 shows a side view of an illustrative configuration of an emitter and an inlet for the quick optimization process of FIG. 14.

FIG. 14 shows a flowchart of an illustrative method 1400 for performing a quick optimization process. While FIG. 14 shows illustrative operations according to one embodiment, other embodiments may omit, add to, reorder, and/or modify any of the operations shown in FIG. 14. Each operation of method 1400 may be performed in any suitable way. FIG. 15 shows a side view of an illustrative configuration of emitter 208 positioned in front of inlet 212 of mass analyzer 104. A legend L has been arbitrarily oriented so that a Z-axis extends along a longitudinal axis 1502 of inlet 212 (indicated by the dash-dot-dash line of FIG. 15), a Y-axis extends vertically within the page (top to bottom in FIG. 15) and is orthogonal to the Z-axis, and an X-axis extends out of the page and is orthogonal to the Y-axis and the Z-axis. Emitter 208 is angled relative to longitudinal axis 1502 within a Y-Z plane.

Referring now to FIG. 14, at operation 1402 position control system 214 identifies a third axis position for emitter 208 relative to inlet 212. As explained above, the third axis position is a fixed position relative to inlet 212 along a third axis (e.g., the X-axis) that is orthogonal to a first axis (e.g., the Z-axis) and to a second axis (e.g., the Y-axis). Position control system 214 may perform operation 1402 in any way described herein, such as based on a default third axis position or by performing method 700 described above.

At operation 1404, position control system 214 identifies a search path. The search path is an imaginary line, within a search plane defined by the first axis and the second axis (e.g., the Y-Z plane) and that includes the third axis position, corresponding to or indicating a distribution of optimum emitter positions while the emitter remains at the third axis position. Operation 1404 will now be described with reference to FIG. 15.

To identify a search path, position control system 214 may acquire a set of mass spectra data by sampling along each of a set of scan lines 1504-1 to 1504-4 within a search plane 1506 (e.g., horizontal and/or vertical lines within the Y-Z plane). Position control system 214 samples along each scan line 1504 by sequentially positioning emitter 208 at each of a plurality of positions along the scan line 1504 and acquiring a mass spectrum while emitter 208 is positioned at each of the plurality of positions along the scan line 1504. Position control system 214 may access instrument configuration data that indicates an instrument configuration (e.g., orientation angle of emitter 208 relative to inlet 212, sheath gas settings (e.g., flowrate), sweep gas settings, FAIMS voltages, FAIMS gas settings, etc.) and, using the instrument configuration data, select two or more scan lines 1504 within search plane 1506 that would be expected to intersect the as-yet unidentified search path. In some examples, position control system 214 accesses the instrument configuration data from storage facility 302 of position control system 214, an onboard memory of the emitter cartridge, and/or based on user input provided by a user. While FIG. 15 shows four scan lines 1504, position control system 214 may sample along any other suitable number of scan lines 1504, such as from two to twenty, four to fifteen, or five to ten. Generally, the number of scan lines 1504 that are sampled is small to facilitate quick optimization of the emitter position. Moreover, while FIG. 15 shows that only horizontal scan lines 1504 are sampled, in other examples, vertical scan lines and/or diagonal scan lines may be sampled in addition or alternatively to horizontal scan lines 1504.

Position control system 214 may then identify, based on the set of mass spectra acquired while emitter 208 is positioned along each scan line 1504, an optimum position 1508 (e.g., optimum positions 1508-1 to 1508-4) for each scan line 1504 (e.g., positions of maximum intensity). Position control system 214 may perform a regression (e.g., a linear regression) to fit a search path 1510 to optimum positions 1508. Where a sheath gas is used search path 1510 will generally follow a linear path from emitter 208 to inlet 212.

Referring again to FIG. 14, at operation 1406 position control system 214 acquires a set of mass spectra while the emitter is sequentially positioned at a plurality of positions along the search path. For example, as shown in FIG. 15, position control system 214 may sequentially position emitter 208 at a plurality of positions along search path 1510 and acquire a mass spectrum while emitter 208 is positioned at each position along search path 1510.

At operation 1408, position control system may identify, based on the set of mass spectra acquired by sampling along search path 1510, an optimum emitter position along search path 1510. The optimum position may be identified in any suitable way. For example, where signal intensity is the figure of merit, the optimum position is the position along search path 1510 at which the detected signal intensity is maximum.

At operation 1410, position control system 214 positions emitter 208 at the optimum position identified at operation 1408. An experiment may then be performed with emitter 208 at the optimum position. With method 1400, an optimum emitter position may be identified quickly without sampling a large search area.

Figure 16B:
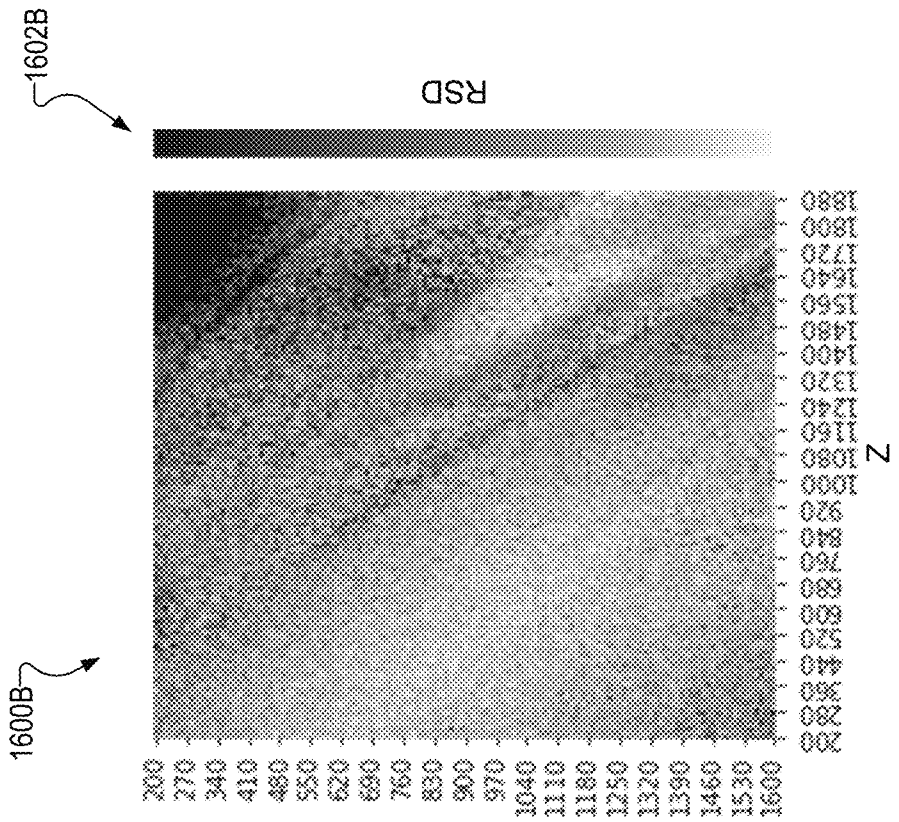
FIGS. 16A and 16B show graphs that depict illustrative relative standard deviation (RSD) maps.
Figure 16A:
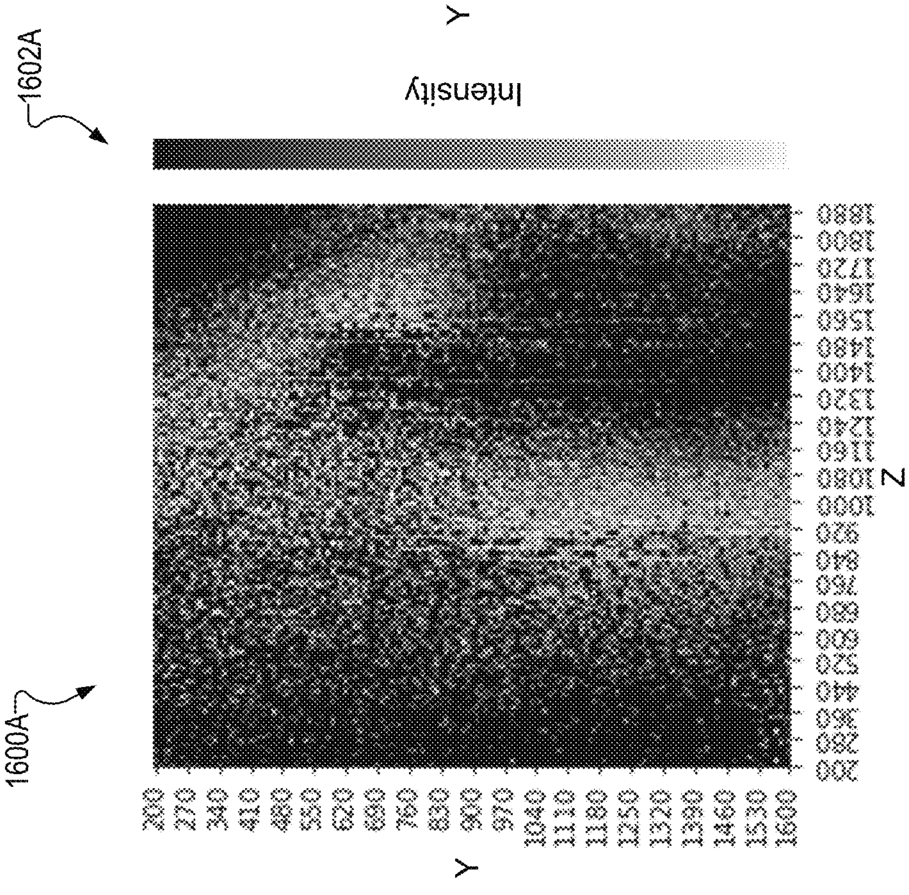

In the examples described above, signal intensity is the figure of merit and position control system 214 determines an optimum position of emitter 208 based on an ion intensity map. In alternative examples, the figure of merit is a measure of signal stability (e.g., standard deviation or RSD) and position control system 214 determines an optimum position of emitter 208 based on a signal stability map. FIGS. 16A and 16B show a graph 1600A and 1600B, respectively, that depict illustrative RSD maps. The RSD map depicted by graph 1600A may be generated from the set of mass spectra acquired by sampling search area 504 of FIGS. 5A and 5B without the use of a sheath gas, and the RSD map depicted by graph 1600B may be generated from the set of mass spectra acquired by sampling search area 504 of FIGS. 5A and 5B with the use of a sheath gas. As shown in graphs 1600A and 1600B, the RSD maps indicate the RSD value at each (Z, Y) coordinate position of emitter 208. As indicated by legends 1602A and 1602B, lighter positions indicate a lower RSD value (higher signal stability) while darker positions indicate higher RSD values (lower signal stability). Similarly, method 1400 may be performed using the measure of signal stability as the figure of merit rather than intensity.

While methods 400 and 1400 have been described above as optimizing the position of emitter 208, methods 400 and 1400 may also optimize other ion source parameters, such as spray voltage, a flow rate of a mobile phase flowing to the emitter and/or a composition of a solvent in the mobile phase (such as in the case of an isocratic gradient), a sheath gas flow rate, optional FAIMS gas flow rate, and/or an electrospray mode. In some examples, position control system 214 may optimize one or more additional parameters together with the emitter position. For example, sampling of the search area (e.g., operation 402) may be performed over a small 4, 5, or n-dimensional hypercube. In alternative examples, position control system 214 may optimize one or more additional parameters independently of the emitter position. This may be performed, for example, after optimization of the emitter position. For example, after identifying an optimal emitter position, position control system 214 may then optimize the sheath gas flow rate, FAIMS gas flow rate, mobile phase flow rate, solvent composition, spray voltage, and/or electrospray mode while emitter 208 is positioned at the optimal position.

In some examples, position control system 214 may acquire multiple sets of mass spectra, with each set of mass spectra being acquired using a unique configuration of parameters (e.g., mobile phase flow rate, sheath gas flow rate, and spray voltage). For each set of mass spectra, position control system 214 may perform method 400 or 1400 to identify an optimum emitter position. In this way, position control system 214 identifies a set of multiple optimum positions for emitter 208, each optimum position configured for a unique set of conditions/parameters. Position control system 214 may then automatically select a particular optimum emitter position from among the set of optimum positions and may move emitter 208 to the selected optimum emitter position. Alternatively, position control system 214 may provide a user with information about the particular parameters of each optimum emitter position and receive user input selecting a particular optimum emitter position. Position control system 214 may then move emitter 208 to the selected optimum emitter position.

As mentioned above, ion source 102 may be connected to a separation system (e.g., an LC system) and operated in an online mode. In the online mode, the composition of the mobile phase may change over time across a gradient of the effluent (e.g., an LC gradient). As a result, the optimum position of emitter 208 may also change with the gradient. Other optimum ion source settings may also change over time, such as the optimum spray voltage and/or optimum sheath gas flow rate. Accordingly, position control system 214 may be configured to schedule adjustment of emitter 208 (e.g., a trajectory of emitter 208) and/or adjustment of other ion source settings to different positions and settings that are optimal at different times in gradient. To this end, position control system 214 may optimize the position of emitter 208 and/or other ion source settings, as described above, for each different target analyte, selected m/z, and/or for each different solvent condition that may be expected during the course of an analytical run. During the analytical run, position control system 214 may adjust the ion source parameters in real time in accordance with the schedule.

Alternatively to scheduling a trajectory of emitter 208 and/or other ion source settings prior to performing an analytical run, position control system 214 may optimize the emitter position and/or other ion source settings in real time during the analytical run as the mobile phase changes. For example, position control system 214 may detect when the effluent from an LC column changes (e.g., when a particular analyte is detected or the intensity of the analyte reaches threshold level) and, in response, may optimize the emitter position and/or other ion source settings using any of the methods described herein.

In some examples, method 400 and method 1400 may be used to determine the quality of emitter 208 or to determine if emitter 208 is damaged. To this end, position control system 214 may obtain data representative of a default home position of emitter 208 based on a given set of conditions (e.g., target analyte, solvent conditions, spray voltage, sheath gas flow rate, etc.) ("default optimization data"). The default optimization data may be generated prior to performing method 400 or method 1400 for a particular experiment and may be stored in any location, such as in a remote computing system, in the emitter cartridge for emitter 208, or in mass spectrometer 100. The default optimization data may be generated for the particular emitter 208 in the factory (e.g., prior to shipping emitter 208 to a customer). Alternatively, the default optimization data may be generated remotely (e.g., remote from position control system 214, mass spectrometer 100, or the emitter cartridge) based on optimization of one or more other emitters, such as based on an aggregation of optimization data collected for a plurality of different emitters each time a customer optimizes an emitter for an experiment.

Position control system 214 may perform method 400 or method 1400 to optimize the position of emitter 208 under the same or similar conditions as in the default optimization data. In some examples, prior to performing method 400 or method 1400, position control system 214 may initialize ion source 102 based on the default optimization data by positioning emitter 208 at the default home position and setting the other ion source settings to their default values. Position control system 214 may then execute method 400 or method 1400 to optimize the ion source settings.

Position control system 214 may then compare the optimum ion source settings obtained with the default optimization data. If the optimum position of emitter 208 (or optimum spray voltage or sheath gas flow rate) is out of tolerance with the default optimization data (e.g., the optimum position varies from the expected optimum position by more than a threshold amount, or the measured signal at the optimum position does not satisfy a threshold criterion (e.g., a minimum threshold intensity or SNR level or maximum threshold RSD), position control system 214 may determine that emitter 208 is damaged or installed incorrectly and may perform a mitigation operation. A mitigation operation may include alerting a user (e.g., by an audio, visual, or haptic notification or message) that emitter 208 is not functioning correctly (e.g., is damaged or installed improperly), performing another optimization method under different conditions, prompting the user to make manual adjustments to emitter 208 or other ion source settings or classification rules or criteria, and/or any other suitable operation.

In some examples the quality check process just described may be performed with respect to multiple different target analytes. For example, position control system 214 may determine that emitter 208 is functioning properly only if the quality check is satisfied for a minimum number of target analytes or over a particular m/z range.

Various modifications may be made to the examples described above. For example, the set of mass spectra may be acquired by acquiring more than one mass spectrum at each emitter position and generating the ion intensity map based on multiple mass spectra for each emitter position (e.g., a summed signal, an average signal, a median signal, etc.).

In the examples described above, position control system 214 automatically positions emitter 208 to optimize the signal quality, such as signal intensity, SNR, or stability (e.g., RSD). In other examples that will now be described, position control system 214 automatically positions emitter 208 to optimize the position of emitter 208 for reproducibility. In these examples, position control system 214 is configured to position tip 210 of emitter 208 at an optimum position relative to inlet 212, which is a position at or sufficiently close to a reference position relative to inlet 212, regardless of the type and configuration of instruments and components used and regardless of any variations in manufacturing tolerances of the instruments and components used. Image-based automatic positioning will now be described with reference to FIG. 17.

Figure 17:
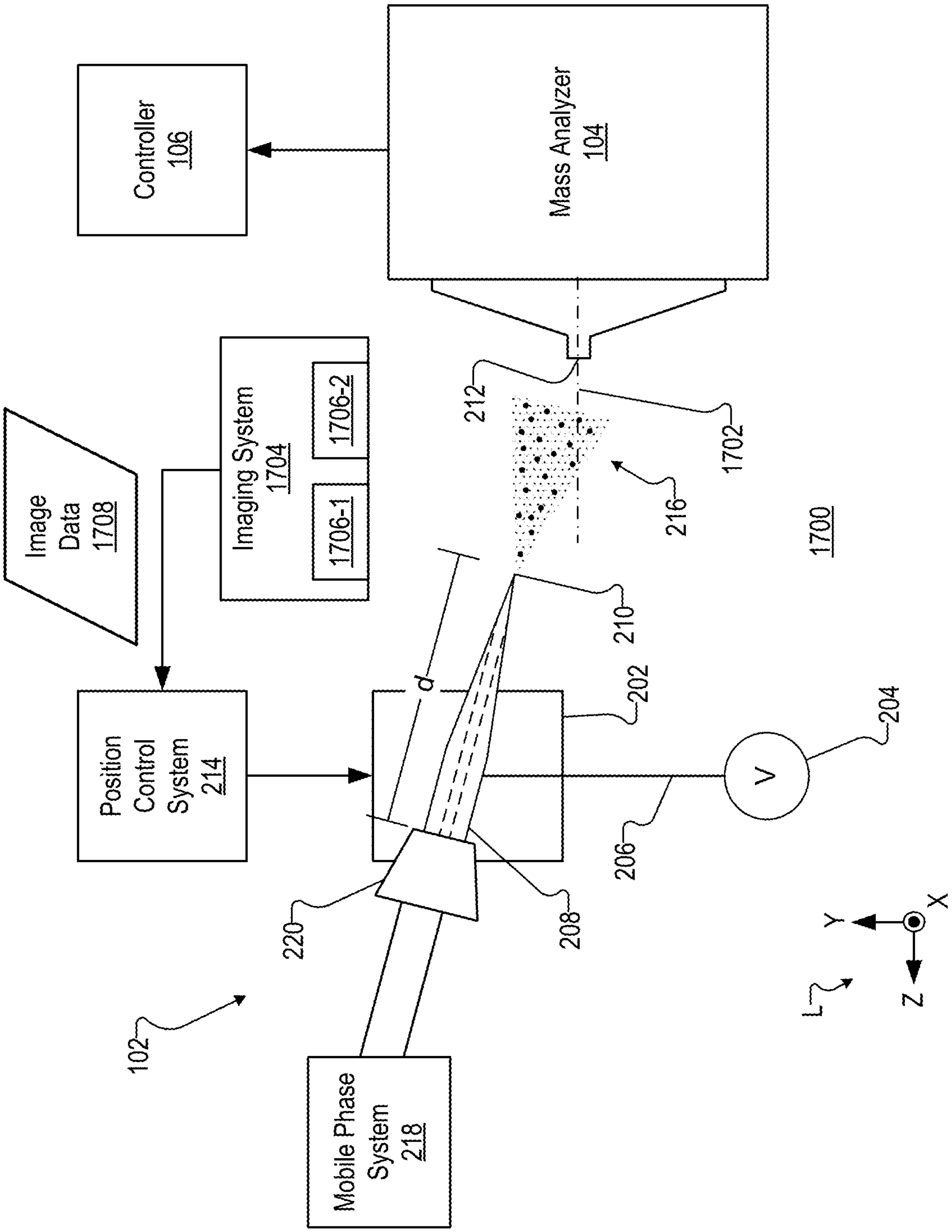
FIG. 17 shows a functional diagram of an illustrative interface between an ion source and a mass analyzer for image-based automated emitter positioning.

FIG. 17 shows a functional diagram of an illustrative configuration 1700 of an interface between ion source 102 and mass analyzer 104. FIG. 17 is merely illustrative, as ion source 102 and mass analyzer 104 may have other suitable configurations. Various elements shown and described in FIG. 17 were shown and described with reference to FIG. 2 and thus will not be described again here.

The position of inlet 212 relative to an ion source mount (not shown) where ion source 102 (e.g., automated positioning system 202) mounts to the mass spectrometer in a fixed relation with inlet 212 may vary for different configurations and designs of inlet 212. For example, inlet 212 may have different configurations, such as an orifice, a capillary, a FAIMS orifice, a letterbox inlet, a narrow bore inlet, or a slotted inlet. In some examples, a sweep cap hangs over inlet 212. In other examples, inlet 212 protrudes past a sweep cap. Some configurations of inlet 212 have a protrusion while other configurations have no protrusion. As a result of these variations, the position of tip 210, when emitter 208 is positioned at a default position (e.g., a default motor position of automated positioning system 202), relative to inlet 212 may vary across different instrument configurations, in some examples up to 0.50 mm. Additionally, inlet 212 is generally sealed in mass analyzer 104 with an O-ring, so variations in O-ring compression, even for the same type of inlet 212, may result in variations in the position of tip 210 relative to inlet 212 across different instruments or installations, or even over time as the O-ring wears out. These variations are in addition to variations due to tolerances in the manufacturing of various mechanical parts and the aggregation of the variations of multiple components. In the examples described herein, the position of emitter 208 relative to inlet 212 refers to the position of emitter 208 relative to a center of the aperture of inlet 212 lying on an imaginary plane that includes an outermost surface of inlet 212 (e.g., an end of inlet 212 nearest to emitter 208), where the plane is generally orthogonal to the longitudinal axis 1702 of inlet 212.

At ion source 102, the distance that tip 210 protrudes from a distal end of nozzle 220 may vary across different emitters due to variations in manufacturing tolerances. For example, for an electrospray ionization emitter the protrusion of tip 210 from the distal end of nozzle 220 (labeled as distance d) may range from about 1.0 mm to about 2.5 mm across different emitters. As a result, when emitters 208 are positioned at a default position (e.g., a default motor position of automated positioning system 202), the position of tip 210 of emitter 208 relative to inlet 212 may vary across different emitters.

As a result of the variations in ion source 102 and/or inlet 212, reproducibility of an experiment may be affected across different instrument types and configurations and/or over time as parts wear down. Position control system 214 may compensate for these variations by performing an automated positioning process based on image data representative of images that depict inlet 212 and emitter 208 positioned near inlet 212.

As shown in FIG. 17, ion source 102 includes an imaging system 1704 communicatively coupled with position control system 214. Imaging system 1704 is configured to capture images of the interface between ion source 102 and mass analyzer 104 (e.g., images of inlet 212 and emitter 208 positioned near inlet 212). Imaging system 1704 may be implemented by any suitable imaging system and may include software and hardware components. In the example of FIG. 17, because position control system 214 positions emitter 208 within a three dimensional space in front of inlet 212, imaging system 1704 includes two cameras 1706 (e.g., camera 1706-1 and camera 1706-2) positioned such that optical axes of cameras 1706 are substantially orthogonal to one another (e.g., 90°±5°. For example, first camera 1706-1 may be positioned above or below emitter 208 with an optical axis extending along a first axis (e.g., the Y-axis, as in FIGS. 5A-6B) and second camera 1706-2 may be positioned to a side of emitter 208 with an optical axis extending along a second axis (e.g., the X-axis, as in FIGS. 5A-6B). Cameras 1706 are configured to capture visible light (including full color, monochromatic, or non-white light images) and/or infrared light images of the scene. It will be recognized that imaging system 1704 may include any other suitable number of cameras (e.g., three or more). In other implementations, imaging system 1704 comprises one or more three-dimensional (3D) cameras configured to capture three-dimensional images of the scene.

In some examples, imaging system 1704 also includes a control unit (not shown) configured to control operation of cameras 1706 (e.g., turn camera sensors ON and OFF, adjust a zoom or focus, set exposure parameters, etc.) and an image processor (not shown) (e.g., software and/or hardware) for processing the captured images, such as to perform white balance and/or adjust a gain. Imaging system 1704 outputs the processed images as image data 1708. While FIG. 17 shows that position control system 214 and imaging system 1704 are separate, in other examples one or more components of imaging system 1704 (e.g., the control unit, image processor, etc.) are included, in whole or in part, in position control system 214.

In the image-based automated positioning process, position control system 214 obtains image data 1708 from imaging system 1704 and adjusts a position of emitter 208 (e.g., a position of tip 210) relative to inlet 212 based on image data 1708. For example, position control system 214 may use image data 1708 to determine an optimum position of emitter 208 and direct automated positioning system 202 to move emitter 208 to the optimum position. The optimum position is a position at, or within a threshold distance of, a reference position relative to inlet 212. The reference position may be obtained by position control system 214 (e.g., from onboard memory on an emitter cartridge for emitter 208, from controller 106, or from a remote computing system) or may be determined experimentally, such as by performing method 400 or method 1400 described above.

Figure 18:
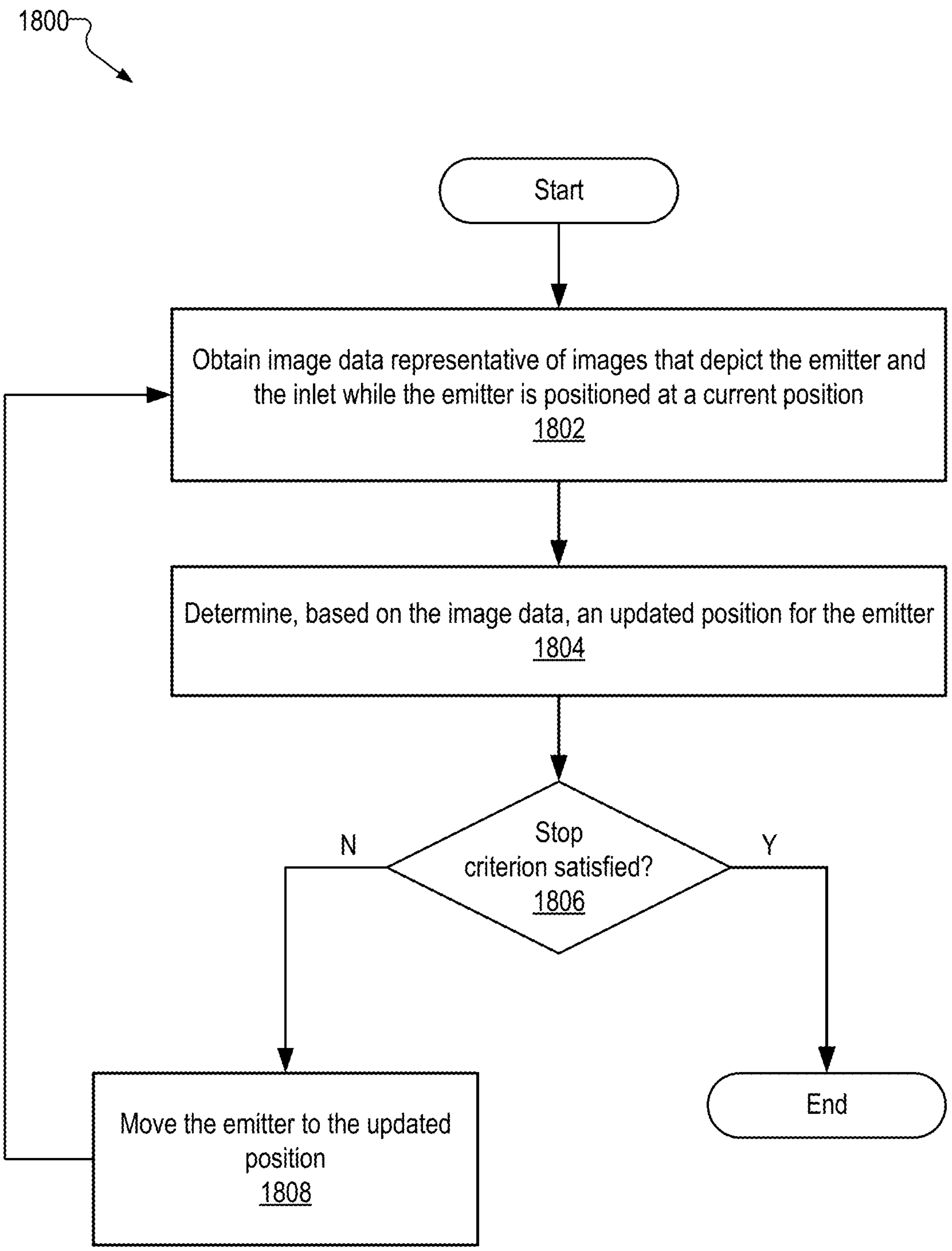
FIG. 18 shows a flowchart of an illustrative method for iteratively performing image-based automated emitter positioning.

In some examples, the image-based automated positioning process is an iterative optimization process. An illustrative iterative image-based automated positioning process will now be described with reference to FIGS. 17 and 18. FIG. 18 shows a flowchart of an illustrative method 1800 for performing an iterative image-based automated positioning process. While FIG. 18 shows illustrative operations according to one embodiment, other embodiments may omit, add to, reorder, and/or modify any of the operations shown in FIG. 18. Each operation of method 1800 may be performed in any suitable way. The description of method 1800 that follows will be described using the two-camera implementation of imaging system 1704, as described above. However, it will be recognized that method 1800 may alternatively be performed using any other suitable implementation of imaging system 1704.

Method 1800 begins with emitter 208 positioned at an initial position. The initial position may be a default home position or may be a user-defined position. In some examples, the default position is a default motor position stored in firmware of ion source 102 based on fixed motor coordinates of automated positioning system 202. In some examples, the default home position is the reference position that has been determined experimentally (e.g., by performing method 400 or method 1400). The default home position may be specific for the particular instrument configuration (e.g., inlet type, ion source, emitter type, etc.) and/or experiment conditions (e.g., mobile phase flowrate, sheath gas flowrate, sweep gas, spray voltage, spray mode, etc.). The particular instrument configuration and/or experiment conditions may be determined in any suitable way, such as based on user input provided by way of controller 106 or position control system 214, by accessing the instrument configuration stored in controller 106 or in ion source 102, and/or based on image recognition (as will be described below in more detail) using image data 1708 generated by imaging system 1704.

At operation 1802, position control system 214 obtains image data 1708 representative of images captured while emitter 208 is positioned at a current position (e.g., the initial position). Image data 1708 includes data representative of one or more images captured by first camera 1706-1 and one or more images captured by second camera 1706-2. To obtain the image data 1708, position control system 214 may direct imaging system 1704 to capture one or more images of the scene while emitter 208 is positioned at the current position.

At operation 1804, position control system 214 determines, based on image data 1708, an updated position for emitter 208. For example, position control system 214 may determine a motor step direction and/or a motor step size for automated positioning system 202 and/or determine the updated position (motor coordinates) for emitter 208 based on the determined step. The step direction and/or step size and the corresponding updated emitter position may be determined using an emitter positioning algorithm and image data 1708 for the current emitter position. Any suitable algorithm or model may be used as the emitter positioning algorithm, such as an iterative algorithm, an optimization algorithm, and/or a machine learning model. In some examples, some randomness can be used in the determination of the step direction and/or step size. For example, the emitter positioning algorithm may incorporate a random search or random walks.

In some examples, the emitter positioning algorithm is configured to compare image data 1708 with reference image data to determine the proximity of the current position of the emitter relative to a reference position for the emitter. The reference position for the emitter may be determined from reference image data, which includes one or more sets of images depicting an emitter located at the reference position (e.g., an ideal or optimum position) relative to an inlet. Each set of images of the reference image data may include a first image captured by camera 1706-1 and a second image captured by camera 1706-2. Each set of images of the reference image data may depict a unique configuration of the ion source, the inlet, or a combination of the ion source and the inlet. For example, each set of images of the reference image data may depict an emitter having a unique variation in the protrusion of tip 210 from the distal end of nozzle 220. Additionally or alternatively, each set of images of the reference image data may depict a unique type of inlet 212. Thus, the reference image data depicts various different configurations of an emitter positioned at a reference position relative to an inlet. The reference image data may be generated prior to performing method 1800 using configuration 1700 or any other configuration of an ion source and an inlet.

The emitter positioning algorithm may be configured to compare image data 1708 with the reference image data to determine a direction in which the emitter is currently offset from a reference position (the "offset direction"). In some examples, the emitter positioning algorithm may determine the offset direction based on multiple different sets of images included in the reference image data based on the assumption that the emitter tip in each set of images is positioned at roughly the same location relative to the inlet regardless of the particular configuration of the ion source and the inlet. In other examples, the emitter positioning algorithm may select a particular set of images (e.g., a set of images that best matches image data 1708, e.g., that best matches the emitter configuration and/or inlet configuration depicted in image data 1708) and determine the offset direction based on the selected set of images.

Alternatively to comparing image data 1708 with the reference image data, the emitter positioning algorithm may be previously trained based on the reference image data to determine 3D coordinates for the reference emitter position (e.g., motor coordinates) relative to the inlet. Accordingly, the emitter positioning algorithm may be configured to determine the offset direction based on image data 1708 and the coordinates for the reference emitter position.

Based on the determined offset direction, the emitter positioning algorithm may determine a motor step direction for automated positioning system 202. The emitter positioning algorithm may also determine a motor step size and determine the updated position for emitter 208 (e.g., updated motor coordinates) based on the determined step direction and the motor step size.

The motor step size may be fixed (e.g., constant throughout method 1800), chosen from a schedule, determined adaptively, and/or dynamically modified during method 1800. Large step sizes may make method 1800 robust against noise, while smaller step sizes may prevent method 1800 from overshooting the optimum. The motor step size may be predefined (e.g., accessed from memory) or may be determined based on image data 1708. For example, the emitter positioning algorithm may determine an extent (e.g., a distance) by which the emitter is currently offset from the reference position (the "offset distance"). The offset distance may be measured, for example, as a number of pixels in image data 1708. The motor step size may be determined so as to completely close the offset distance. Alternatively, the motor step size may be chosen so as to close only a fraction of the offset distance, or may otherwise vary based on the offset distance. For instance, the motor step size may decrease (linearly or non-linearly (e.g., exponentially)) as the offset distance decreases. In further examples, the motor step size may decrease with each successive iteration of method 1800.

As mentioned, image features that are used by the emitter positioning algorithm to determine the updated emitter position are identified in image data 1708 and distinguished from noise features. The noise features may include, for example, deposits on surfaces of inlet 212 and/or emitter 208, background or ambient features, and/or any other features captured in the images that are not used for positioning emitter 208. The emitter positioning algorithm may use any suitable image recognition and/or image segmentation process to identify the image features. The image features that may be identified in image data 1708 include, for example, inlet 212 and/or a reference point on emitter 208.

The reference point on emitter 208 is recognizable in image data 1708 and is consistently positioned at a fixed distance from tip 210, even across different emitters and emitter types, with generally little to no variation. Thus, even if the distance d from tip 210 to nozzle 220 varies across different emitters and emitter types, the distance from tip 210 to the reference point has negligible variation across different emitters and emitter types.

Figure 19A:
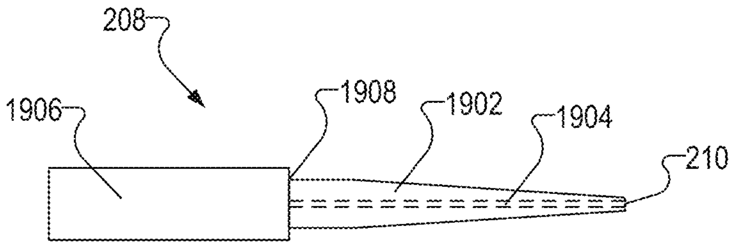
FIG. 19A shows an illustrative configuration of an emitter in which a distal end of an exterior coating of the emitter is a reference point for image-based detection.

In some examples, the reference point on emitter 208 is a native attribute of emitter 208, such as tip 210 or a distal end of an exterior coating on emitter 208. FIG. 19A shows an illustrative configuration of emitter 208 in which the reference point is a distal end of an exterior coating of emitter 208. As shown, emitter 208 is formed of a fused silica core 1902 having an interior lumen 1904 through which the mobile phase may flow. Fused silica core 1902 is coated with an external coating 1906, such as polyimide. Coating 1906 terminates (e.g., is machined or ground off the fused silica core 1902) at a fixed distance from tip 210. The distal end 1908 of coating 1906 is an edge feature that is easily detected in image data 1708 and thus may be used to determine an updated position for emitter 208. The distal end 1908 of coating 1906 may be easier to detect than tip 210, which generally has small dimensions that may be difficult to segment from background features.

Figure 19B:
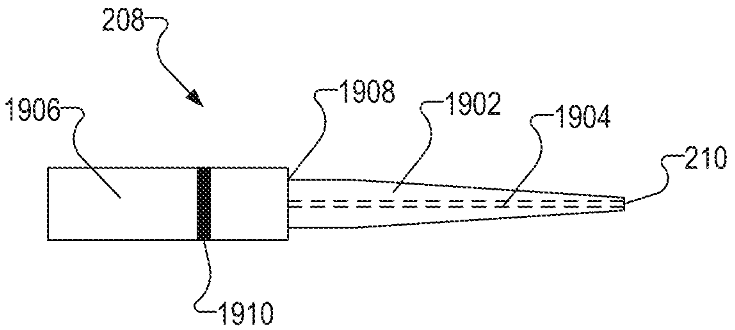
FIG. 19B shows an illustrative configuration of an emitter in which a fiducial marker on the emitter is a reference point for image-based detection.

In other examples, the reference point on emitter 208 is a fiducial marker added to emitter 208. FIG. 19B shows an illustrative configuration of emitter 208 in which the reference point is a fiducial marker added to emitter 208. FIG. 19B is similar to FIG. 19A except that, in FIG. 19B, emitter 208 includes a fiducial marker 1910 on coating 1906. As shown in FIG. 19B, fiducial marker 1910 is a colored band on or around coating 1906. It will be recognized that fiducial marker 1910 may have any suitable color, shape (e.g., a dot, a cross, etc.), and/or pattern that may be recognized through image recognition or image segmentation technologies.

In some examples, the emitter positioning algorithm has been trained to distinguish, in image data 1708, image features that are used to determine the updated emitter position from noise features. The noise features may include, for example, deposits on surfaces of inlet 212 and/or emitter 208, background or ambient features, or any other features captured in the images that are not used for positioning emitter 208. Training of the emitter positioning algorithm will be described below in more detail.

At operation 1806, position control system 214 determines whether a stop criterion has been satisfied. Illustrative strop criteria are described below in more detail. If position control system 214 determines that a stop criterion has not been satisfied, method 1800 proceeds to operation 1808. At operation 1808, position control system 214 controls automated positioning system 202 to move emitter 208 to the updated emitter position identified at operation 1804. Processing of method 1800 then returns to operation 1802 to perform another iteration.

If, however, position control system 214 determines that a stop criterion has been satisfied, position control system 214 terminates method 1800. When method 1800 is terminated, emitter 208 remains at its current position (e.g., the updated position identified in operation 1804 of the immediately prior iteration). Accordingly, method 1800 may be used by position control system 214 to iteratively adjust the position of emitter 208 until emitter 208 has been positioned at an optimum position relative to inlet 212 (e.g., at or within a threshold distance (e.g., 100 μm) of the reference position).

Any suitable stop criterion (or criteria) may be used as may serve a particular implementation. In some examples, the stop criterion comprises completion of a predetermined number of iterations. For example, position control system 214 may track the number of iterations performed in method 1800 and terminate method 1800 when the number of iterations matches a threshold number (e.g., ten).

In additional or other examples, the stop criterion comprises a minimum threshold step size. In this example, the step sizes (or maximum step sizes) may progressively decrease with each iteration. As a result, a certain small step size may be presumed to be indicative of having reached the optimum emitter position. In a modified example, the stop criterion comprises performing a minimum number (e.g., 3) of sequential steps each having a step size that is less than or equal to the minimum threshold step size.

In another example, the stop criterion may be based on probabilities of the step direction of the next step. For example, position control system 214 may determine the probabilities of a backward iterative step and a forward iterative step and compare these probabilities. The step direction probabilities may be determined in any suitable way and may be agnostic of the step size. If the probabilities are about equal (e.g., within an acceptable tolerance or threshold range of each other that may be set, such as within 1%, 0.1%, etc.), position control system 214 may terminate method 1800.

In yet further examples, the stop criterion may comprise a determination that the emitter position has stopped improving. For example, position control system 214 may determine, based on image data 1708 captured during a current iteration, whether the current emitter position is better than the emitter position of a prior iteration. In response to a determination that the emitter position of the current iteration is not better than the emitter position of the prior iteration, position control system 214 may terminate method 1800. Position control system 214 may compare image data 1708 from different iterations in any suitable way, such as by applying one-way analysis of variance ("ANOVA"), the Mann-Whitney U test, the Student's-t test, and/or any other suitable statistical population-based comparison method.

In some examples, upon terminating method 1800, position control system 214 may store data representative of the optimum emitter position in the onboard memory of the emitter cartridge and/or in a storage facility of mass spectrometer 100 (which may associate the optimum position with the particular emitter cartridge and/or with all emitter cartridges of the same type). Additionally or alternatively, position control system 214 may transmit the data representative of the optimum emitter position to a remote computing system, which may use the data alone or in combination with data received from other optimizations to establish a default home position for the particular instrument configuration.

In a modification of method 1800, prior to operation 1802 position control system 214 may determine an instrument interface setup and select, based on the determined instrument interface setup, an appropriate emitter positioning algorithm for positioning emitter 208 (e.g., an algorithm trained for the same or a similar instrument setup). The instrument interface setup may indicate a type and/or configuration (e.g., size, dimension, geometry, etc.) of emitter 208 and/or inlet 212. For example, the instrument setup may indicate dimensions of emitter 208, such as a distance from tip 210 to nozzle 220 or a distance from tip 210 to a reference marker on emitter 208.

In some examples, position control system 214 determines the instrument setup by accessing stored data indicating the instrument setup. For example, position control system 214 may obtain, from controller 106, data indicating a type of inlet 212. Additionally or alternatively, position control system 214 may obtain, from ion source 102 or an on-board memory of an emitter cartridge that has been mounted in ion source 102, a type or configuration of emitter 208.

In further examples, position control system 214 may determine the instrument setup based on image data 1708 captured while the emitter is at the initial (e.g., default) position (or while the emitter is at any other position). Position control system 214 may determine the instrument setup based on image data 1708 in any suitable way, such as based on image segmentation and recognition of a shape of emitter 208 and/or a shape of inlet 212. In some examples, position control system 214 applies image data 1708 as inputs to a trained classification model configured to classify an instrument setup based on image data 1708 of the instrument set up. In some examples, the trained classification model may be trained to classify a type of the inlet (e.g., an orifice, a capillary, a FAIMS orifice, a letterbox inlet, a narrow bore inlet, a slotted inlet, etc.) and/or a type of sweep cap installed on the inlet. The output of the trained classification model may be a classification and, optionally, a confidence score for the classification. In some examples, position control system 214 may determine the instrument setup based on the output classification only when the confidence score exceeds a threshold level. The trained classification model may be implemented by any suitable machine learning model, such as but not limited to a neural network (e.g., a convolutional neural network (CNN)) or a decision tree algorithm. In some examples, the classification model is a supervised machine learning model that is trained using labeled image data depicting various different instrument setups.

In other examples, position control system 214 may determine the instrument setup based on image segmentation and recognition of an emitter identification marker and/or an inlet identification marker. In these examples, the emitter identification marker is a fiducial marker placed on emitter 208 and that identifies a type and/or configuration (e.g., size, dimension, geometry, etc.) of emitter 208. The fiducial marker may be implemented, for example, by a color-coded marker, a shape-coded marker, a pattern-coded marker (e.g., a barcode, a QR code, etc.), and/or any other distinguishable marker. In a similar manner, the inlet identification marker is a fiducial marker positioned near inlet 212 and that identifies a type and/or configuration (e.g., size, dimension, etc.) of inlet 212. The fiducial marker may be implemented, for example, by a color-coded marker, a shape-coded marker, a pattern-coded marker, and/or any other distinguishable marker. Information indicated by the emitter identification marker and/or inlet identification marker may be used in any suitable way, such as to select, from among a plurality of different emitter positioning algorithms, an appropriate emitter positioning algorithm.

While the examples above describe optimizing a position of emitter 208 relative to inlet 212, position control system 214 may additionally or alternatively optimize an angle or orientation of emitter 208 relative to inlet 212 (e.g., longitudinal axis 502 of inlet 212). For example, automated positioning system 202 may be configured to rotate emitter 208 (or the emitter cartridge) about any one or more of the X-axis, Y-axis, and Z-axis. The orientation may of emitter 208 relative to inlet 212 may be adjusted using method 400, method 1400, and/or method 1800 described above. In yet further modifications, the principles described herein may also be applied to any other type of ESI source, such as, but not limited to, conventional ESI, PaperSpray ionization, PolymerSpray ionization, and the like.

As mentioned above, the emitter positioning algorithm may be configured to use image data 1708 to optimize a position of emitter 208 relative to inlet 212. In some examples, the emitter positioning algorithm is trained to recognize, by any suitable image recognition and/or image segmentation process, features in image data 1708. The emitter positioning algorithm may be trained in any suitable way. In some examples, a training dataset includes reference image data representative of multiple sets of images (e.g.,) each depicting a particular configuration of the inlet type (e.g., a FAIMS inlet, an ITT inlet, an HCTT inlet, etc.) with an emitter positioned, in each image, at a reference position relative to the inlet. A set of images may include, for each configuration of the inlet type and emitter, a first image captured by camera 1706-1 and a second image captured by camera 1706-2. In some examples, the training dataset includes different sets of images of the same inlet configuration but with different noise levels (e.g., depicting different levels of deposits on the inlet and/or emitter and/or different background features). The emitter positioning algorithm may be trained to recognize features to be used for positioning emitter 208 (e.g., tip 210 of emitter 208, distal end 1908 of coating 1906, fiducial marker 1910, inlet 212) and/or to disregard noise (e.g., accumulated surface deposits on inlet 212, accumulated surface deposits on emitter 208, and/or background features).

In some examples, the trained emitter positioning algorithm may also be used to determine if emitter 208 has been exchanged by comparing previously saved image data 1708 with current image data 1708 (e.g., with image data 1708 captured while emitter 208 is positioned at a current position). Position control system 214 may adjust the emitter position coordinates (e.g., motor coordinates for automated positioning system 202) stored for the currently-installed emitter cartridge in response to a determination that distance d from tip 210 to nozzle 220 has changed by more than a threshold amount (e.g., by more than 50 μm, more than 100 μm, or more than 150 μm). In this way, position control system 214 may automatically perform method 1800 when an emitter cartridge is replaced during an experiment. In additional or alternative examples, position control system 214 may reset a counter on the emitter cartridge that indicates historical usage or estimated remaining useful life of the emitter (e.g. number of injections, number of hours energized, total amount of current or solvent leaving the emitter, etc.) in response to the determination that distance d from tip 210 to nozzle 220 has changed by more than a threshold amount.

In some examples, position control system 214 may be configured to use image data representative of captured images that depict spray plume 216 to optimize the position of emitter 208 relative to inlet 212. For example, cameras 1706-1 and/or 1706-2, or an additional camera (not shown in FIG. 17) may be configured to capture images of spray plume 216 when a mobile phase passes through emitter 208 and is emitted toward inlet 212. The emitter positioning algorithm used by position control system 214 to position emitter 208 may be configured to use, in addition or alternatively to image data 1708, image data representative of the captured images of spray plume 216 to determine a position emitter 208 relative to inlet 212. For example, position control system 214 may use images of spray plume 216 to align spray plume 216 with inlet 212.

In some examples, position control system 214 may be configured to use image data 1708 to determine a condition of an instrument (e.g., emitter 208 and/or inlet 212). For example, position control system 214 may compare image data 1708 with reference image data depicting emitter 208 and/or inlet 212 when emitter 208 and/or inlet 212 is in an ideal (e.g., new, recently cleaned, good, satisfactory, etc.) condition and determine, based on the comparison, whether inlet 212 is in a good condition or a poor condition. Any suitable image recognition techniques may be used for the comparison. In some examples, position control system 214 may apply image data 1708 to a trained machine learning model that is trained to classify the instrument condition. The possible instrument condition classifications may include, for example, "good" and "poor." Other instrument condition classifications may be possible, such as one or more intermediate instrument conditions (e.g., "moderate"). In yet further examples, the instrument condition may be represented by a numerical number, such as a number between 100% (for a best condition) and 0% (for a worst condition). In some examples, the number may represent a degree of deposits buildup on and/or around emitter 208 and/or inlet 212. Any suitable machine learning model may be used, such as a logistic regression model, a neural network (e.g., a CNN), a decision tree model, a Naïve Bayes model, a k-nearest neighbor (KNN) model, or a support vector machine (SVM). The machine learning model may be trained in any suitable way, including by supervised learning or by unsupervised learning. In some examples, a training dataset includes image data depicting instruments in various different conditions (e.g., different levels of deposits buildup). In some examples, the training dataset is labeled with a known classification for each depicted instrument condition.

Position control system 214 may be configured to perform a particular operation based on the determined instrument condition. In some examples, position control system 214 may provide an indication of the instrument condition. The indication may be provided, for example, at the outset of performing method 400 or method 1800. Additionally or alternatively, the indication may be provided at any time, including during an analytical experiment, in response to user input requesting a report of the instrument condition. In further examples, when the instrument condition is determined to be in a particular condition (e.g., "poor" or less than a threshold level (e.g., 70%)), position control system 214 may automatically provide a notification of the instrument condition, such as by way of a display screen communicatively coupled with position control system 214, may suspend performance of an experiment until a user provides user input to recommence the experiment, and/or may suspend performance of an experiment until position control system 214 determines that the inlet condition has improved (e.g., has changed to "good" or is above a threshold level (e.g., above 70%)).

Various modifications may be made to the examples described above. For example, ion source 102 may be configured to emit, from emitter 208, ions toward an inlet of any other ion manipulation device, such as an ion guide, ion optics, or an ion mobility separator. In other modifications, the systems and methods described above may be used with other electrospray ionization techniques, such as PaperSpray ionization and PolymerSpray ionization.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 20:
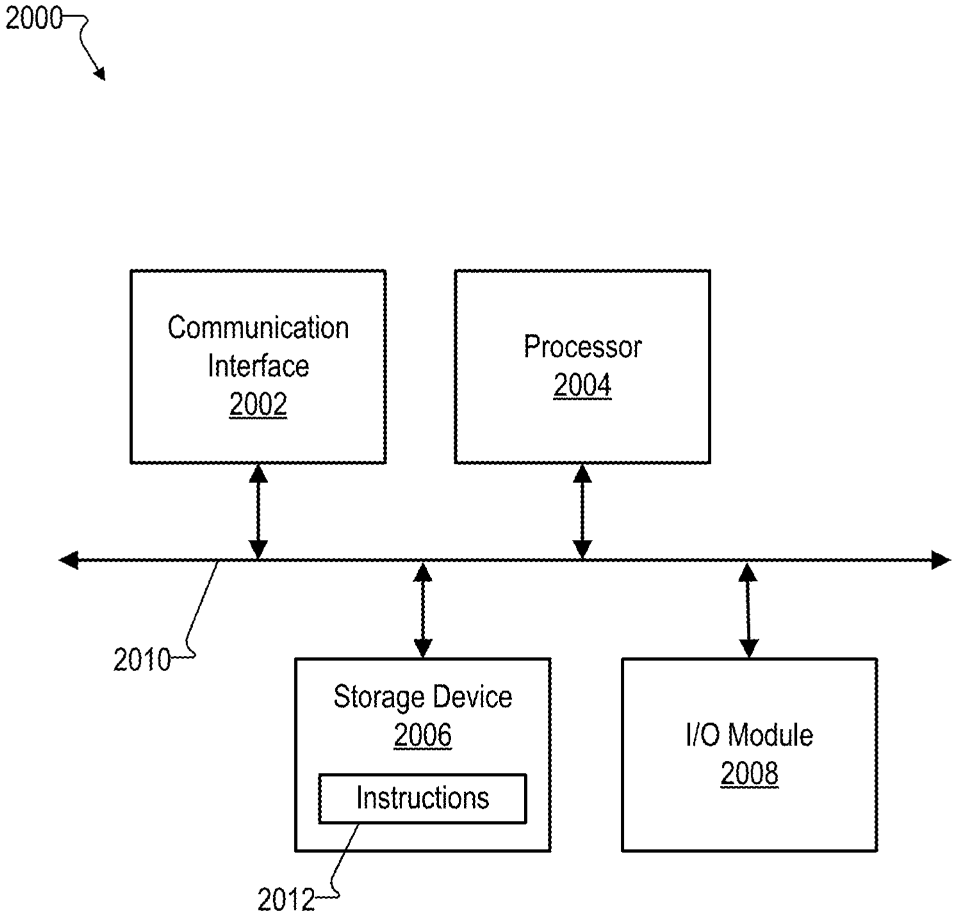
FIG. 20 shows an illustrative computing device.

FIG. 20 shows an illustrative computing device 2000 that may be specifically configured to perform one or more of the processes described herein. As shown in FIG. 20, computing device 2000 may include a communication interface 2002, a processor 2004, a storage device 2006, and an input/output ("I/O") module 2008 communicatively connected one to another via a communication infrastructure 2010. While an illustrative computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit capable of processing data and/or interpreting, executing, and/or directing execution of one or more of the instructions, processes, and/or operations described herein. Processor 2004 may perform operations by executing computer-executable instructions 2012 (e.g., an application, software, code, and/or other executable data instance) stored in storage device 2006.

Storage device 2006 may include one or more data storage media, devices, or configurations and may employ any type, form, and combination of data storage media and/or device. For example, storage device 2006 may include, but is not limited to, any combination of the non-volatile media and/or volatile media described herein. Electronic data, including data described herein, may be temporarily and/or permanently stored in storage device 2006. For example, data representative of computer-executable instructions 2012 configured to direct processor 2004 to perform any of the operations described herein may be stored within storage device 2006. In some examples, data may be arranged in one or more databases residing within storage device 2006.

I/O module 2008 may include one or more I/O modules configured to receive user input and provide user output. One or more I/O modules may be used to receive input for a single virtual experience. I/O module 2008 may include any hardware, firmware, software, or combination thereof supportive of input and output capabilities. For example, I/O module 2008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 2000. For example, storage facility 302 may be implemented by storage device 2006, and processing facility 304 may be implemented by processor 2004.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. A system comprising: one or more processors; and memory storing executable instructions that, when executed by the one or more processors, cause a computing device to perform a process comprising: acquiring a set of mass spectra, the acquiring the set of mass spectra comprising: directing an automated positioning system to sequentially position an ionization emitter at a plurality of positions relative to an inlet of a mass spectrometer; and directing the mass spectrometer to acquire, while the ionization emitter is positioned at each position of the plurality of positions, a mass spectrum of ions introduced into the inlet, wherein the ions introduced into the inlet include ions emitted from the ionization emitter; generating, based on the set of mass spectra, an ion intensity map representing detected intensity of ions introduced into the inlet of the mass spectrometer as a function of position of the ionization emitter; and identifying, based on the ion intensity map, an optimum position for the ionization emitter.

Example 2. The system of example 1, wherein the ion intensity map comprises a total ion map that indicates, for each position of the plurality of positions, a summed intensity of the ions while the ionization emitter is positioned at each respective position.

Example 3. The system of example 1, wherein the ion intensity map comprises an extracted ion map that indicates, for each position of the plurality of positions, a summed intensity of a subset of the ions while the ionization emitter is positioned at each respective position.

Example 4. The system of example 3, wherein the subset of ions comprises a set of the ions corresponding to the most intense signals.

Example 5. The system of example 3, wherein the subset of ions comprises only ions having an m/z value less than a threshold m/z value.

Example 6. The system of example 5, wherein the threshold m/z value is about 300 m/z.

Example 7. The system of example 3, wherein the subset of ions comprises only solvent ions.

Example 8. The system of example 3, wherein: the process further comprises classifying a selected ion introduced into the inlet as a contaminant ion; and the subset of ions excludes the ion classified as a contaminant ion.

Example 9. The system of example 8, wherein the classifying the selected ion as a contaminant ion comprises: generating, based on the set of mass spectra, an extracted ion map for the selected ion; and classifying the selected ion based on the extracted ion map and a reference ion map.

Example 10. The system of example 9, wherein the reference ion map is based on a reference set of mass spectra.

Example 11. The system of example 9, wherein the reference ion map comprises a total ion map generated based on the set of mass spectra.

Example 12. The system of example 9, wherein the classifying the selected ion based on the extracted ion map and the reference ion map comprises determining, based on the extracted ion map and the reference ion map, at least one of a cross-correlation coefficient and a matrix norm-to-mean ratio.

Example 13. The system of example 8, wherein the classifying the selected ion as a contaminant ion comprises determining that a sheath gas flows coaxially around the ions emitted from the ionization emitter and that an extracted ion map for the selected ion does not have a linear cloud distribution.

Example 14. The system of example 3, wherein: the process further comprises classifying one or more of the ions introduced into the inlet as proxy ions; and the subset of ions comprises only the one or more ions classified as proxy ions.

Example 15. The system of example 1, wherein each mass spectrum of the set of mass spectra is acquired by a selected ion monitoring (SIM) acquisition.

Example 16. The system of example 15, wherein the SIM acquisition covers an m/z range of about 30 m/z to about 300 m/z.

Example 17. The system of example 1, wherein the process further comprises directing the automated positioning system to position the ionization emitter at the optimum position.

Example 18. The system of example 1, wherein: a sheath gas flows coaxially around the ions emitted from the ionization emitter; and the plurality of positions relative to the inlet are located along a linear search path.

Example 19. The system of example 18, wherein the process further comprises identifying the search path, wherein identifying the search path comprises: acquiring an additional set of mass spectra data by sequentially positioning the emitter at a plurality of positions along each of a plurality of scan lines and acquiring a mass spectrum while the emitter is positioned at each of the plurality of positions;

identifying, based on the additional set of mass spectra, an optimum position along each scan line; and determining the search path based on the optimum position of each scan line.

Example 20. A non-transitory computer-readable medium storing instructions that, when executed, direct at least one processor of a computing device for mass spectrometry to perform a process comprising: acquiring a set of mass spectra, the acquiring the set of mass spectra comprising: directing an automated positioning system to sequentially position an ionization emitter at a plurality of positions relative to an inlet of a mass spectrometer; and directing the mass spectrometer to acquire, while the ionization emitter is positioned at each position of the plurality of positions, a mass spectrum of ions introduced into the inlet, wherein the ions introduced into the inlet include ions emitted from the ionization emitter; generating, based on the set of mass spectra, an ion intensity map representing detected intensity of ions introduced into the inlet of the mass spectrometer as a function of position of the ionization emitter; and identifying, based on the ion intensity map, an optimum position for the ionization emitter.

Example 21. The computer-readable medium of example 20, wherein the ion intensity map comprises a total ion map that indicates, for each position of the plurality of positions, a summed intensity of the ions while the ionization emitter is positioned at each respective position.

Example 22. The computer-readable medium of example 20, wherein the ion intensity map comprises an extracted ion map that indicates, for each position of the plurality of positions, a summed intensity of a subset of the ions while the ionization emitter is positioned at each respective position.

Example 23. The computer-readable medium of example 22, wherein the subset of ions comprises a set of the ions corresponding to the most intense signals.

Example 24. The computer-readable medium of example 22, wherein the subset of ions comprises only ions having an m/z value less than a threshold m/z value.

Example 25. The computer-readable medium of example 24, wherein the threshold m/z value is about 300 m/z.

Example 26. The computer-readable medium of example 22, wherein the subset of ions comprises only solvent ions.

Example 27. The computer-readable medium of example 22, wherein: the process further comprises classifying a selected ion introduced into the inlet as a contaminant ion; and the subset of ions excludes the ion classified as a contaminant ion.

Example 28. The computer-readable medium of example 27, wherein the classifying the selected ion as a contaminant ion comprises: generating, based on the set of mass spectra, an extracted ion map for the selected ion; and classifying the selected ion based on the extracted ion map and a reference ion map.

Example 29. The computer-readable medium of example 28, wherein the reference ion map is based on a reference set of mass spectra.

Example 30. The computer-readable medium of example 28, wherein the reference ion map comprises a total ion map generated based on the set of mass spectra.

Example 31. The computer-readable medium of example 28, wherein the classifying the selected ion based on the extracted ion map and the reference ion map comprises determining, based on the extracted ion map and the reference ion map, at least one of a cross-correlation coefficient and a matrix norm-to-mean ratio.

Example 32. The computer-readable medium of example 27, wherein the classifying the selected ion as a contaminant ion comprises determining that a sheath gas flows coaxially around the ions emitted from the ionization emitter and that an extracted ion map for the selected ion does not have a linear cloud distribution.

Example 33. The computer-readable medium of example 22, wherein: the process further comprises classifying one or more of the ions introduced into the inlet as proxy ions; and the subset of ions comprises only the one or more ions classified as proxy ions.

Example 34. The computer-readable medium of example 20, wherein each mass spectrum of the set of mass spectra is acquired by a selected ion monitoring (SIM) acquisition.

Example 35. The computer-readable medium of example 34, wherein the SIM acquisition covers an m/z range of about 30 m/z to about 300 m/z.

Example 36. The computer-readable medium of example 20, wherein the process further comprises directing the automated positioning system to position the ionization emitter at the optimum position.

Example 37. The computer-readable medium of example 20, wherein: a sheath gas flows coaxially around the ions emitted from the ionization emitter; and the plurality of positions relative to the inlet are located along a linear search path.

Example 38. The computer-readable medium of example 37, wherein the process further comprises identifying the search path, wherein identifying the search path comprises: acquiring an additional set of mass spectra data by sequentially positioning the emitter at a plurality of positions along each of a plurality of scan lines and acquiring a mass spectrum while the emitter is positioned at each of the plurality of positions; identifying, based on the additional set of mass spectra, an optimum position along each scan line; and determining the search path based on the optimum position of each scan line.

Example 39. A system comprising: one or more processors; and memory storing executable instructions that, when executed by the one or more processors, cause a computing device to perform a process comprising: acquiring a set of mass spectra, the acquiring the set of mass spectra comprising: directing an automated positioning system to sequentially position an ionization emitter at a plurality of positions relative to an inlet of a mass spectrometer; and directing the mass spectrometer to acquire, while the ionization emitter is positioned at each position of the plurality of positions, a mass spectrum of ions introduced into the inlet, wherein the ions introduced into the inlet include ions emitted from the ionization emitter; generating, based on the set of mass spectra, an ion signal quality map representing a figure of merit of signals corresponding to ions introduced into the inlet of the mass spectrometer as a function of position of the ionization emitter; and identifying, based on the ion signal quality map, an optimum position for the ionization emitter.

Example 40. The system of example 39, wherein the figure of merit comprises signal-to-noise ratio (SNR) and the ion signal quality map comprises an SNR map.

Example 41. The system of example 39, wherein the figure of merit comprises relative standard deviation (RSD) and the ion signal quality map comprises an RSD map.

Example 42. The system of example 39, wherein the figure of merit comprises a measure of signal stability and the ion signal quality map quality comprises a signal stability map.

Example 43. The system of example 39, wherein the process further comprises directing the automated positioning system to position the ionization emitter at the optimum position.

Example 44. A system comprising: one or more processors; and memory storing executable instructions that, when executed by the one or more processors, cause a computing device to perform a process comprising: obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet.

Example 45. The system of example 44, wherein the process comprises an iterative optimization process comprising a plurality of iterations, wherein each iteration comprises: acquiring a portion of the image data while the emitter is positioned at a current position; determining, based on an emitter positioning algorithm and the portion of the image data acquired while the emitter is positioned at the current position, an updated position for the emitter; and directing an automated positioning system to move the emitter to the updated position.

Example 46. The system of example 45, wherein each iteration further comprises: determining whether a stop criterion is satisfied; and terminating the iterative optimization process in response to a determination that the stop criterion is satisfied.

Example 47. The system of example 46, wherein determining that the stop criterion is satisfied comprises determining, based on the portion of image data captured during a current iteration, that a probability of a backward iterative step and a probability of a forward iterative step are within a tolerance range of each other.

Example 48. The system of example 45, wherein the process further comprises: determining, based on the image data, an instrument interface setup; and selecting, based on the determined instrument interface setup, the emitter positioning algorithm from among a plurality of different emitter positioning algorithms each configured for a particular instrument interface setup.

Example 49. The system of example 44, wherein: the emitter is included in an emitter cartridge having an on-board memory; and the process further comprises storing, in the on-board memory of the emitter cartridge, the optimum position of the emitter.

Example 50. The system of example 44, wherein the adjusting the position of the emitter comprises: identifying, in the image data based on an emitter positioning algorithm, the inlet and a reference point on the emitter; and determining, based on the inlet and the reference point on the emitter, the optimum position of the emitter.

Example 51. The system of example 50, wherein the reference point on the emitter comprises a distal end of an external coating of the emitter.

Example 52. The system of example 50, wherein the reference point on the emitter comprises a fiducial marker on the emitter.

Example 53. The system of example 44, further comprising an imaging system configured to generate the image data.

Example 54. The system of example 53, wherein the imaging system comprises a first camera and a second camera positioned so that optical axes of the first camera and the second camera are substantially orthogonal.

Example 55. A non-transitory computer-readable medium storing instructions that, when executed, direct at least one processor of a computing device for mass spectrometry to perform a process comprising: obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet.

Example 56. The computer-readable medium of example 55, wherein the process comprises an iterative optimization process comprising a plurality of iterations, wherein each iteration comprises: acquiring a portion of the image data while the emitter is positioned at a current position; determining, based on an emitter positioning algorithm and the portion of the image data acquired while the emitter is positioned at the current position, an updated position for the emitter; and directing an automated positioning system to move the emitter to the updated position.

Example 57. The computer-readable medium of example 56, wherein each iteration further comprises: determining whether a stop criterion is satisfied; and terminating the iterative optimization process in response to a determination that the stop criterion is satisfied.

Example 58. The computer-readable medium of example 57, wherein determining that the stop criterion is satisfied comprises determining, based on the portion of image data captured during a current iteration, that a probability of a backward iterative step and a probability of a forward iterative step are within a tolerance range of each other.

Example 59. The computer-readable medium of example 56, wherein the process further comprises: determining, based on the image data, an instrument interface setup; and selecting, based on the determined instrument interface setup, the emitter positioning algorithm from among a plurality of different emitter positioning algorithms each configured for a particular instrument interface setup.

Example 60. The computer-readable medium of example 55, wherein: the emitter is included in an emitter cartridge having an on-board memory; and the process further comprises storing, in the on-board memory of the emitter cartridge, the optimum position of the emitter.

Example 61. The computer-readable medium of example 55, wherein the adjusting the position of the emitter comprises: identifying, in the image data based on an emitter positioning algorithm, the inlet and a reference point on the emitter; and determining, based on the inlet and the reference point on the emitter, the optimum position of the emitter.

Example 62. The computer-readable medium of example 61, wherein the reference point on the emitter comprises a distal end of an external coating of the emitter.

Example 63. The computer-readable medium of example 61, wherein the reference point on the emitter comprises a fiducial marker on the emitter.

Example 64. A system comprising: an automated positioning system configured to hold an ionization emitter near an inlet of a mass spectrometer and adjust a position of the ionization emitter relative to the inlet of the mass spectrometer; an imaging system configured to capture images of the ionization emitter and the inlet of the mass spectrometer; and a position control system configured to perform a process comprising: obtaining, from the imaging system, image data representative of one or more images that depict the inlet of the mass spectrometer and the ionization emitter positioned near the inlet; and directing, based on the image data, the automated positioning system to adjust the position of the ionization emitter relative to the inlet of the mass spectrometer to an optimum position that is at or near a reference position relative to the inlet.

Example 65. The system of example 64, wherein the imaging system comprises a first camera and a second camera, wherein optical axes of the first camera and the second camera are substantially orthogonal to one another.

Example 66. The system of example 65, wherein the process comprises an iterative optimization process comprising a plurality of iterations, wherein each iteration comprises: acquiring a portion of the image data while the ionization emitter is positioned at a current position; determining, based on an emitter positioning algorithm and the portion of the image data acquired while the ionization emitter is positioned at the current position, an updated position for the ionization emitter; and directing the automated positioning system to move the ionization emitter to the updated position.

Example 67. The system of example 66, wherein the process further comprises: determining, based on the image data, an instrument interface setup; and selecting, based on the determined instrument interface setup, the emitter positioning algorithm from among a plurality of different emitter positioning algorithms each configured for a particular instrument interface setup.

What is claimed is:

1. A system comprising:

one or more processors; and memory storing executable instructions that, when executed by the one or more processors, cause a computing device to perform a process comprising:

obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet, wherein the process comprises an iterative optimization process comprising a plurality of iterations, wherein each iteration comprises:

acquiring a portion of the image data while the emitter is positioned at a current position;

determining, based on an emitter positioning algorithm and the portion of the image data acquired while the emitter is positioned at the current position, an updated position for the emitter, wherein determining the updated position for the emitter further comprises:

determining, based on the image data, an instrument interface setup; and selecting, based on the determined instrument interface setup, the emitter positioning algorithm from among a plurality of different emitter positioning algorithms each configured for a particular instrument interface setup; and directing an automated positioning system to move the emitter to the updated position.

2. The system of claim 1, wherein each iteration further comprises:

determining whether a stop criterion is satisfied; and terminating the iterative optimization process in response to a determination that the stop criterion is satisfied.

3. The system of claim 2, wherein determining that the stop criterion is satisfied comprises determining, based on the portion of image data captured during a current iteration, that a probability of a backward iterative step and a probability of a forward iterative step are within a tolerance range of each other.

4. The system of claim 1, wherein:

the emitter is included in an emitter cartridge having an on-board memory; and the process further comprises storing, in the on-board memory of the emitter cartridge, the optimum position of the emitter.

5. The system of claim 1, wherein the adjusting the position of the emitter comprises:

identifying, in the image data based on an emitter positioning algorithm, the inlet and a reference point on the emitter; and determining, based on the inlet and the reference point on the emitter, the optimum position of the emitter.

6. The system of claim 5, wherein the reference point on the emitter comprises a distal end of an external coating of the emitter.

7. The system of claim 5, wherein the reference point on the emitter comprises a fiducial marker on the emitter.

8. The system of claim 1, further comprising an imaging system configured to generate the image data.

9. The system of claim 8, wherein the imaging system comprises a first camera and a second camera positioned so that optical axes of the first camera and the second camera are substantially orthogonal.

10. A non-transitory computer-readable medium storing instructions that, when executed, direct at least one processor of a computing device for mass spectrometry to perform a process comprising:

obtaining image data representative of one or more images that depict an inlet of a mass spectrometer and an emitter positioned near the inlet; and adjusting, based on the image data, a position of the emitter relative to the inlet to an optimum position that is at or near a reference position relative to the inlet, wherein the process comprises an iterative optimization process comprising a plurality of iterations, wherein each iteration comprises:

acquiring a portion of the image data while the emitter is positioned at a current position;

determining, based on an emitter positioning algorithm and the portion of the image data acquired while the emitter is positioned at the current position, an updated position for the emitter, wherein determining the updated position for the emitter further comprises:

determining, based on the image data, an instrument interface setup; and selecting, based on the determined instrument interface setup, the emitter positioning algorithm from among a plurality of different emitter positioning algorithms each configured for a particular instrument interface setup; and directing an automated positioning system to move the emitter to the updated position.

11. The computer-readable medium of claim 10, wherein each iteration further comprises:

determining whether a stop criterion is satisfied; and terminating the iterative optimization process in response to a determination that the stop criterion is satisfied.

12. The computer-readable medium of claim 11, wherein determining that the stop criterion is satisfied comprises determining, based on the portion of image data captured during a current iteration, that a probability of a backward iterative step and a probability of a forward iterative step are within a tolerance range of each other.

13. The computer-readable medium of claim 10, wherein:

the emitter is included in an emitter cartridge having an on-board memory; and the process further comprises storing, in the on-board memory of the emitter cartridge, the optimum position of the emitter.

14. The computer-readable medium of claim 10, wherein the adjusting the position of the emitter comprises:

identifying, in the image data based on an emitter positioning algorithm, the inlet and a reference point on the emitter; and determining, based on the inlet and the reference point on the emitter, the optimum position of the emitter.

15. A system comprising:

an automated positioning system configured to hold an ionization emitter near an inlet of a mass spectrometer and adjust a position of the ionization emitter relative to the inlet of the mass spectrometer;

an imaging system configured to capture images of the ionization emitter and the inlet of the mass spectrometer, wherein the imaging system comprises a first camera and a second camera, wherein optical axes of the first camera and the second camera are substantially orthogonal to one another; and a position control system configured to perform a process comprising:

obtaining, from the imaging system, image data representative of one or more images that depict the inlet of the mass spectrometer and the ionization emitter positioned near the inlet; and directing, based on the image data, the automated positioning system to adjust the position of the ionization emitter relative to the inlet of the mass spectrometer to an optimum position that is at or near a reference position relative to the inlet, wherein the process comprises an iterative optimization process comprising a plurality of iterations, wherein each iteration comprises:

acquiring a portion of the image data while the ionization emitter is positioned at a current position;

determining, based on an emitter positioning algorithm and the portion of the image data acquired while the ionization emitter is positioned at the current position, an updated position for the ionization emitter, wherein determining the updated position for the ionization further comprises:

determining, based on the image data, an instrument interface setup; and selecting, based on the determined instrument interface setup, the emitter positioning algorithm from among a plurality of different emitter positioning algorithms each configured for a particular instrument interface setup; and directing the automated positioning system to move the ionization emitter to the updated position.

* * * * *